(12) United States Patent
Venugopal et al.

(10) Patent No.: US 12,224,815 B2
(45) Date of Patent: Feb. 11, 2025

(54) AUTONOMOUS SWITCHING BETWEEN SINGLE FREQUENCY NETWORK (SFN) AND NON-SFN SCHEME

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/481,065

(22) Filed: Sep. 21, 2021

(65) Prior Publication Data
US 2023/0090808 A1 Mar. 23, 2023

(51) Int. Cl.
*H04B 7/024* (2017.01)
*H04B 7/06* (2006.01)
*H04B 17/336* (2015.01)
*H04W 72/044* (2023.01)
*H04W 88/10* (2009.01)

(52) U.S. Cl.
CPC ........... *H04B 7/024* (2013.01); *H04B 7/0695* (2013.01); *H04B 17/336* (2015.01); *H04W 72/046* (2013.01); *H04W 88/10* (2013.01)

(58) Field of Classification Search
CPC ... H04L 1/0054; H04L 25/067; H04L 1/0071; H04B 7/024; H04B 17/336; H04B 7/0695; H04W 72/046; H04W 88/10
USPC ......................................................... 375/262
See application file for complete search history.

(56) References Cited

U.S. PATENT DOCUMENTS

| 11,108,613 | B2 | 8/2021 | Manolakos et al. |
| 2018/0091968 | A1* | 3/2018 | Ly .................. H04W 36/324 |
| 2020/0052950 | A1* | 2/2020 | Manolakos ......... H04L 27/2657 |
| 2020/0267748 | A1* | 8/2020 | Khoshnevisan ...... H04L 1/0023 |
| 2021/0194571 | A1* | 6/2021 | Ma ..................... H04B 7/2125 |

(Continued)

FOREIGN PATENT DOCUMENTS

| EP | 3826345 A1 | 5/2021 |
| WO | WO-2021160926 A1 | 8/2021 |

OTHER PUBLICATIONS

Partial International Search Report—PCT/US2022/075329—ISA/EPO—Nov. 23, 2022 (2105301WO).

(Continued)

*Primary Examiner* — Syed Haider
(74) *Attorney, Agent, or Firm* — Holland & Hart LLP

(57) ABSTRACT

Methods, systems, and devices for wireless communications are described. In some wireless communications systems, a user equipment (UE) may support communications with a set of transmission/reception points (TRPs). The UE may receive one or more signals from at least one TRP of the set of TRPs. The one or more signals may indicate a condition corresponding to the UE for the multi-TRP communications. The UE may determine the condition of the UE based on the one or more signals. The UE may communicate with one or more TRPs of the set of TRPs based on the one or more signals. For example, the UE may communicate with the one or more TRPs according to a multi-TRP communications configuration determined based on the condition of the UE.

16 Claims, 17 Drawing Sheets

(56) References Cited

U.S. PATENT DOCUMENTS

| | | | |
|---|---|---|---|
| 2021/0195609 A1 | 6/2021 | Taherzadeh Boroujeni et al. | |
| 2022/0095304 A1* | 3/2022 | Muruganathan | H04B 7/024 |
| 2022/0369123 A1* | 11/2022 | Zhang | H04B 17/336 |
| 2023/0096196 A1* | 3/2023 | Kim | H04L 5/0053 |
| | | | 370/329 |
| 2023/0111603 A1* | 4/2023 | Ghimire | H04B 7/0421 |
| | | | 455/456.1 |
| 2023/0133979 A1* | 5/2023 | Sun | H04W 72/20 |
| | | | 370/329 |

OTHER PUBLICATIONS

International Search Report and Written Opinion—PCT/US2022/075329—ISA/EPO—Feb. 8, 2023 (2105301WO).

* cited by examiner

AUTONOMOUS SWITCHING BETWEEN SINGLE FREQUENCY NETWORK (SFN) AND NON-SFN SCHEME

INTRODUCTION

The following relates generally to wireless communications, and more specifically including single frequency network (SFN) and non-SFN schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving one or more signals from at least one transmission/reception point (TRP) of a set of TRPs associated with one or more multi-TRP communications configurations, the one or more signals indicating a condition corresponding to the UE for a multi-TRP communications configuration of the one or more multi-TRP communications configurations. In some examples, the method may include communicating with one or more TRPs of the set of TRPs associated with multi-TRP communications based on the one or more signals, the communicating according to the multi-TRP communications configuration determined based on the condition.

An apparatus for wireless communications at a UE is described. The apparatus may include a processor and memory coupled to the processor. The processor and memory may be configured to receive one or more signals from at least one TRP of a set of TRPs associated with one or more multi-TRP communications configurations, the one or more signals indicating a condition corresponding to the UE for a multi-TRP communications configuration of the one or more multi-TRP communications configurations. In some examples, the processor and memory may be configured to communicate with one or more TRPs of the set of TRPs associated with multi-TRP communications based on the one or more signals, the communicating according to the multi-TRP communications configuration determined based on the condition.

Another apparatus for wireless communications at a UE is described. The apparatus may include means for receiving one or more signals from at least one TRP of a set of TRPs associated with one or more multi-TRP communications configurations, the one or more signals indicating a condition corresponding to the UE for a multi-TRP communications configuration of the one or more multi-TRP communications configurations. In some examples, the apparatus may include means for communicating with one or more TRPs of the set of TRPs associated with multi-TRP communications based on the one or more signals, the communicating according to the multi-TRP communications configuration determined based on the condition.

A non-transitory computer-readable medium storing code for wireless communications at a UE is described. The code may include instructions executable by a processor to receive one or more signals from at least one TRP of a set of TRPs associated with one or more multi-TRP communications configurations, the one or more signals indicating a condition corresponding to the UE for a multi-TRP communications configuration of the one or more multi-TRP communications configurations. In some examples, the code may include instructions executable by a processor to communicate with one or more TRPs of the set of TRPs associated with multi-TRP communications based on the one or more signals, the communicating according to the multi-TRP communications configuration determined based on the condition.

Some examples of the method, apparatuses, and non-transitory computer-readable medium described herein may further include operations, features, means, or instructions for receiving a control message indicating a first metric, a second metric, and one or more thresholds associated with the first metric and the second metric for determining the condition corresponding to the UE for the multi-TRP communications configuration. Some examples of the method, apparatuses, and non-transitory computer-readable medium described herein may further include operations, features, means, or instructions for measuring the first metric associated with a first signal of the one or more signals. In some examples, the first signal may be received from the at least one TRP. Some examples of the method, apparatuses, and non-transitory computer-readable medium described herein may further include operations, features, means, or instructions for measuring the second metric associated with a second signal of the one or more signals, the second signal received from a second TRP of the set of TRPs.

Some examples of the method, apparatuses, and non-transitory computer-readable medium described herein may further include operations, features, means, or instructions for comparing a difference between the first metric and the second metric with a threshold differential associated with the first metric and the second metric. In some examples, the one or more thresholds may include the threshold differential. Some examples of the method, apparatuses, and non-transitory computer-readable medium described herein may further include operations, features, means, or instructions for transmitting uplink signaling indicating the condition based on comparing the difference with the threshold differential.

Some examples of the method, apparatuses, and non-transitory computer-readable medium described herein may further include operations, features, means, or instructions for comparing the first metric with a first threshold, where the one or more thresholds include the first threshold, and comparing the second metric with a second threshold, where the one or more thresholds include the second threshold. Some examples of the method, apparatuses, and non-transitory computer-readable medium described herein may further include operations, features, means, or instructions for transmitting uplink signaling indicating the condition based on comparing the first metric with the first threshold and comparing the second metric with the second threshold.

In some examples of the method, apparatuses, and non-transitory computer-readable medium described herein, the first metric, the second metric, or both correspond to a reference signal received power (RSRP), a signal-to-interference-plus-noise ratio (SINR), a doppler measurement, or a combination thereof.

Some examples of the method, apparatuses, and non-transitory computer-readable medium described herein may further include operations, features, means, or instructions for transmitting an uplink reference signal based on the one or more signals. Some examples of the method, apparatuses, and non-transitory computer-readable medium described herein may further include operations, features, means, or instructions for receiving a control message indicating the condition in response to the uplink reference signal.

In some examples of the method, apparatuses, and non-transitory computer-readable medium described herein, the one or more signals include tracking reference signals (TRSs) and the condition may correspond to a location of the UE relative to the set of TRPs. In some examples, the location may be determined based on the TRSs.

In some examples of the method, apparatuses, and non-transitory computer-readable medium described herein, and the method, apparatuses, and non-transitory computer-readable medium may include further operations, features, means, or instructions for determining a geographic location of the UE based on the positioning signals and transmitting, via an uplink control channel, an uplink signal indicating the geographic location of the UE. In some examples, the geographic location may correspond to the condition and the multi-TRP communications configuration.

Some examples of the method, apparatuses, and non-transitory computer-readable medium described herein may further include operations, features, means, or instructions for transmitting a physical uplink control channel (PUCCH) or a medium access control-control element (MAC-CE) indicating the geographic location of the UE.

Some examples of the method, apparatuses, and non-transitory computer-readable medium described herein may further include operations, features, means, or instructions for determining the geographic location of the UE based on a speed of the UE, or a trajectory of the UE, or both, the UE moving relative to the set of TRPs.

Some examples of the method, apparatuses, and non-transitory computer-readable medium described herein may further include operations, features, means, or instructions for receiving a broadcast message indicating the multi-TRP communications configuration for the UE and one or more other UEs. In some examples, the broadcast message may be based on the condition being common to the UE and the one or more other UEs.

Some examples of the method, apparatuses, and non-transitory computer-readable medium described herein may further include operations, features, means, or instructions for receiving a control message indicating the one or more multi-TRP communications configurations including the multi-TRP communications configuration. In some examples, each multi-TRP communications configuration of the one or more multi-TRP communications configurations may correspond to a respective condition.

In some examples of the method, apparatuses, and non-transitory computer-readable medium described herein, the respective condition may correspond to a respective zone of the UE relative to the set of TRPs. In some examples of the method, apparatuses, and non-transitory computer-readable medium described herein, a first zone associated with a first region that may be associated with a first TRP of the set of TRPs may correspond to a single TRP communications configuration with the first TRP. In some examples of the method, apparatuses, and non-transitory computer-readable medium described herein, a second zone associated with a second region that may be between the first TRP and the second TRP may correspond to an SFN communications scheme with the first TRP and the second TRP.

Some examples of the method, apparatuses, and non-transitory computer-readable medium described herein may further include operations, features, means, or instructions for receiving downlink control information (DCI) indicating a second multi-TRP communications configuration and communicating with the one or more TRPs according to the second multi-TRP communications configuration in accordance with the DCI.

In some examples of the method, apparatuses, and non-transitory computer-readable medium described herein, the multi-TRP communications configuration includes one or more of an SFN communications scheme, a multi-TRP communications scheme, or a non-SFN communications scheme.

A method for wireless communications at a network node including a set of TRPs associated with one or more multi-TRP communications configurations is described. The method may include transmitting, via at least one TRP of the set of TRPs, one or more signals to a UE. In some examples, the one or more signals may indicate a condition corresponding to the UE for a multi-TRP communications configuration of the one or more multi-TRP communications configurations. In some examples, the method may further include communicating with the UE via one or more TRPs of the set of TRPs associated with multi-TRP communications based on the one or more signals, the communicating according to the multi-TRP communications configuration determined based on the condition.

An apparatus for wireless communications at a network node including a set of TRPs associated with one or more multi-TRP communications configurations is described. The apparatus may include a processor and memory coupled to the processor. The processor and memory may be configured to transmit, via at least one TRP of the set of TRPs, one or more signals to a UE. In some examples, the one or more signals may indicate a condition corresponding to the UE for a multi-TRP communications configuration of the one or more multi-TRP communications configurations. In some examples, the processor and memory may be configured to communicate with the UE via one or more TRPs of the set of TRPs associated with multi-TRP communications based on the one or more signals, the communicating according to the multi-TRP communications configuration determined based on the condition.

Another apparatus for wireless communications at a network node including a set of TRPs associated with one or more multi-TRP communications configurations is described. The apparatus may include means for transmitting, via at least one TRP of the set of TRPs, one or more signals to a UE. In some examples, the one or more signals may indicate a condition corresponding to the UE for a multi-TRP communications configuration of the one or more multi-TRP communications configurations. In some examples, the apparatus may include means for communicating with the UE via one or more TRPs of the set of TRPs associated with multi-TRP communications based on the one or more signals, the communicating according to the multi-TRP communications configuration determined based on the condition.

A non-transitory computer-readable medium storing code for wireless communications at a network node including a set of TRPs associated with one or more multi-TRP communications configurations is described. The code may include instructions executable by a processor to transmit, via at least one TRP of the set of TRPs, one or more signals to a UE. In some examples, the one or more signals may indicate a condition corresponding to the UE for a multi-TRP communications configuration of the one or more multi-TRP communications configurations. In some examples, the code may include instructions executable by the processor to communicate with the UE via one or more TRPs of the set of TRPs associated with multi-TRP communications based on the one or more signals, the communicating according to the multi-TRP communications configuration determined based on the condition.

Some examples of the method, apparatuses, and non-transitory computer-readable medium described herein may further include operations, features, means, or instructions for transmitting, to the UE, a control message indicating a first metric, a second metric, and one or more thresholds associated with the first metric and the second metric for determining the condition corresponding to the UE for the multi-TRP communications configuration.

Some examples of the method, apparatuses, and non-transitory computer-readable medium described herein may further include operations, features, means, or instructions for receiving uplink signaling from the UE indicating the condition based on the one or more signals, the first metric, the second metric, and the one or more thresholds.

In some examples of the method, apparatuses, and non-transitory computer-readable medium described herein, the first metric, the second metric, or both correspond to a RSRP, a SINR, a doppler measurement, or a combination thereof.

Some examples of the method, apparatuses, and non-transitory computer-readable medium described herein may further include operations, features, means, or instructions for receiving, from the UE, an uplink reference signal based on the one or more signals. Some examples of the method, apparatuses, and non-transitory computer-readable medium described herein may further include operations, features, means, or instructions for transmitting a control message indicating the condition in response to the uplink reference signal.

In some examples of the method, apparatuses, and non-transitory computer-readable medium described herein, the one or more signals include TRSs and the condition corresponds to a location of the UE relative to the set of TRPs, the location determined based on the TRSs.

In some examples of the method, apparatuses, and non-transitory computer-readable medium described herein, and the method, apparatuses, and non-transitory computer-readable medium may include further operations, features, means, or instructions for receiving, from the UE via an uplink control channel, an uplink signal indicating a geographic location of the UE based on the positioning signals. In some examples, the geographic location may correspond to the condition and the multi-TRP communications configuration.

Some examples of the method, apparatuses, and non-transitory computer-readable medium described herein may further include operations, features, means, or instructions for receiving a PUCCH or a MAC-CE indicating the geographic location of the UE.

Some examples of the method, apparatuses, and non-transitory computer-readable medium described herein may further include operations, features, means, or instructions for transmitting, to the UE and one or more other UEs, a broadcast message indicating the multi-TRP communications configuration for the UE and the one or more other UEs based on the condition being common to the UE and the one or more other UEs.

Some examples of the method, apparatuses, and non-transitory computer-readable medium described herein may further include operations, features, means, or instructions for transmitting, to the UE, a control message indicating the one or more multi-TRP communications configurations including the multi-TRP communications configuration. In some examples, each multi-TRP communications configuration of the one or more multi-TRP communications configurations may correspond to a respective condition.

In some examples of the method, apparatuses, and non-transitory computer-readable medium described herein, the respective condition corresponds to a respective zone of the UE relative to the set of TRPs. In some examples of the method, apparatuses, and non-transitory computer-readable medium described herein, a first zone associated with a first region that may be associated with a first TRP of the set of TRPs may correspond to a single TRP communications configuration with the first TRP. In some examples of the method, apparatuses, and non-transitory computer-readable medium described herein, a second zone associated with a second region that may be between the first TRP and a second TRP of the set of TRPs may correspond to an SFN communications scheme with the first TRP and the second TRP.

Some examples of the method, apparatuses, and non-transitory computer-readable medium described herein may further include operations, features, means, or instructions for transmitting DCI indicating a second multi-TRP communications configuration and communicating with the UE according to the second multi-TRP communications configuration in accordance with the DCI.

In some examples of the method, apparatuses, and non-transitory computer-readable medium described herein, the multi-TRP communications configuration includes one or more of an SFN communications scheme, a multi-TRP communications scheme, or a non-SFN communications scheme.

DETAILED DESCRIPTION

Figure 1:
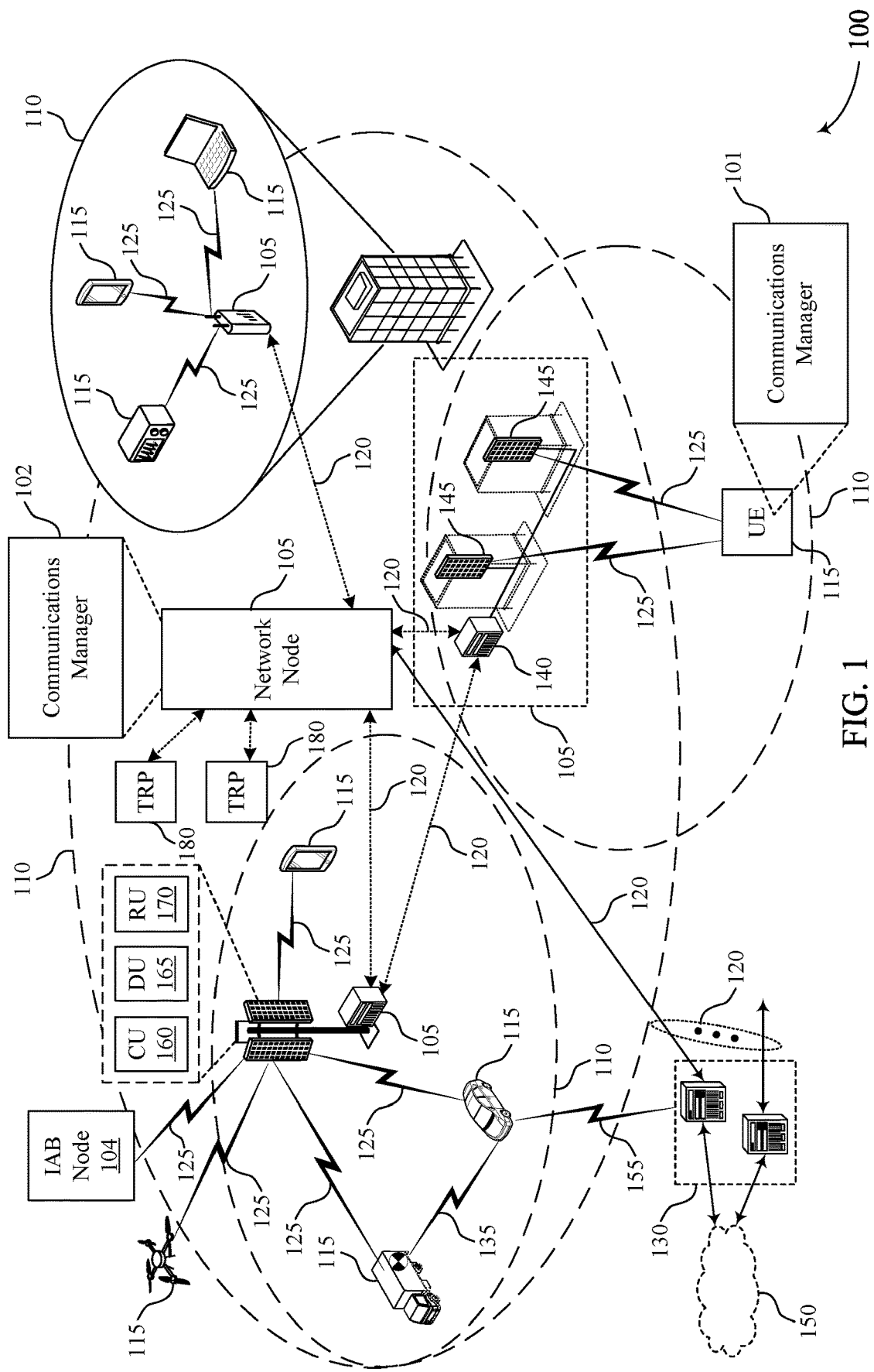
FIG. 1 illustrates an example of a wireless communications system that supports autonomous switching between SFN and non-SFN schemes in accordance with one or more aspects of the present disclosure.

A wireless communications system may include communication devices, such as a base station (e.g., an eNodeB (eNB), a next-generation NodeB or a giga-NodeB, any of which may be referred to as a gNB, or some other base station) or a UE that may support multiple radio access technologies. Examples of radio access technologies include 4G systems, such as LTE systems, and 5G systems, which may be referred to as NR systems. In some systems, a UE may communicate with the network via a network node, which may be an example of a control node, a base station, a TRP, or some other network entity. The network node may include or be in communication with one or more access network transmission entities to use for communication with a UE or other device, such as TRPs (which may also be referred to as radio heads). The network node may transmit or relay data or control signaling to one or more UEs via the TRPs, which may be included in or in communication with the network node. The network node may communicate with the UE according to a multi-TRP configuration, an SFN configuration, or a non-SFN configuration. In a multi-TRP configuration, the network node may send signals to the UE via multiple TRPs. The signals communicated according to the multi-TRP configuration or the non-SFN configuration may each include different information and may not be synchronized in time or frequency.

In some examples, to improve communication reliability, the wireless communications system may support an SFN configuration, in which one or more TRPs of the network may transmit a same signal to a UE in a synchronized manner (e.g., in a same time resource, frequency resource, or both). In an SFN configuration, each TRP may transmit a reference signal to the UE via a respective channel. The UE may measure a channel (e.g., for time or frequency tracking) between the UE and each TRP based on the respective reference signal. The UE may estimate an SFN channel (which may be referred to as a joint SFN channel or a combined SFN channel) that includes combination of each channel between the UE and each TRP in communication with the UE. The UE may estimate the combined SFN channel based on each channel measurement performed by the UE. In a non-SFN configuration, the network node may communicate with the UE using one or more TRPs. The signals transmitted by each TRP may or may not be synchronized in time or frequency and may or may not include the same information. The UE may support dynamic or semi-static switching between an SFN communications configuration and a non-SFN communications configuration based on received control signaling, such as DCI, radio resource control (RRC) signaling, or a MAC-CE. In some cases, multiple UEs may be located in relatively close proximity to one another, one or more UEs may be moving at relatively high speeds, or both, and transmitting control signaling to indicate a switch between communication configurations may be associated with relatively large overhead and latency.

To reduce overhead and improve efficiency, a UE may be configured to determine whether to communicate according to an SFN communications configuration, a non-SFN communications configuration, or one or more other communications configurations, such as a multi-TRP communications configuration or a single-TRP communications configuration (e.g., the network node may communicate with the UE using a single TRP), based on a condition of the UE, a condition associated with a link between the UE and one or more TRPs, or both. According to one or more examples, the condition of the UE may be related to positioning information, measurement information, or both. For example, a location of the UE may be determined based on global positioning system (GPS) signaling, satellite signaling, or other signaling that conveys positioning information of the UE. If the location of the UE satisfies one or more conditions (e.g., if the UE is located within a configured zone or geographical region relative to one or more TRPs), the UE may determine a corresponding multi-TRP communications configuration to use. Additionally, or alternatively, the UE may receive reference signals from one or more TRPs. The UE may measure one or more metrics (e.g., an RSRP, an SINR, a doppler measurement, or some other metric) associated with each TRP based on the reference signals. A multi-TRP communications configuration for the UE to use may be determined based on whether a condition corresponding to the measured metrics satisfies one or more thresholds. In some cases, a condition of the UE may correspond to a differential between reference signal measurements from two or more TRPs.

In some examples, the UE may be configured with a set of multi-TRP communications configurations that each correspond to one or more conditions of the UE. The UE may thereby determine the condition based on the geographic location of the UE or measuring signals received by the UE, and the UE, the network node, or both, may identify which multi-TRP communications configuration corresponds to the identified condition. If the UE determines the condition, the UE may transmit uplink reference signals or uplink control signals to the network node to indicate the determined condition, a corresponding multi-TRP communications configuration, or both. Additionally, or alternatively, the network node may determine the condition of the UE based on uplink reference signals, or some other signals, and the network node may transmit a downlink control message to the UE to indicate the condition and the corresponding multi-TRP communications configuration.

The UE may thereby switch between multi-TRP communications configurations based on conditions of the UE, which may provide for the network node to refrain from transmitting control signals to indicate each switch between communications configurations. As such, by configuring the UE with multi-TRP communications configurations that correspond to respective conditions of the UE, the network node may reduce overhead, reduce latency, and improve utilization of communication resources. In some examples, multiple UEs may correspond to a same condition, and the network node may transmit a broadcast message indicating control signals or data for the multiple UEs, which may further reduce overhead and latency.

Aspects of the disclosure are initially described in the context of wireless communications systems. Additional aspects are described with reference to communication scheme diagrams and a process flow. Aspects of the disclosure are further illustrated by and described with reference to apparatus diagrams, system diagrams, and flowcharts that relate to autonomous switching between SFN and non-SFN schemes.

FIG. 1 illustrates an example of a wireless communications system 100 that supports autonomous switching between SFN and non-SFN schemes in accordance with one or more aspects of the present disclosure. The wireless communications system 100 may include one or more network nodes 105, one or more UEs 115, and a core network 130. In some examples, the wireless communications system 100 may be a LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The network nodes 105 and the UEs 115 may wirelessly communicate via one or more communication links 125. Each network node 105 may provide a coverage area 110 over which the UEs 115 and the network node 105 may establish one or more communication links 125. The coverage area 110 may be an example of a geographic area over which a network node 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network nodes 105 (e.g., a base station, a control node, or some other network node), or network equipment (e.g., core network nodes, relay devices, integrated access and backhaul (IAB) nodes, or other network equipment), as shown in FIG. 1.

The network nodes 105 may communicate with the core network 130, or with one another, or both. For example, the network nodes 105 may interface with the core network 130 through one or more backhaul links 120 (e.g., via an S1, N2, N3, or other interface). The network nodes 105 may communicate with one another over the backhaul links 120 (e.g., via an X2, Xn, or other interface) either directly (e.g., directly between network nodes 105), or indirectly (e.g., via core network 130), or both. In some examples, the backhaul links 120 may be or include one or more wireless links. A UE 115 may communicate with the core network 130 through a communication link 155.

One or more of the network nodes 105 described herein may include or may be referred to by a person having ordinary skill in the art as a base station, base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. The network nodes 105 may include or be associated with a set of TRPs 180. The one or more network nodes 105 may include a communications manager 102 configured to transmit signals to a UE 115 and communicate with the UE using one or more TRPs 180 of the set of TRPs 180.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and network nodes 105. In such cases, the disaggregated UE 115 may include the respective physical devices configured to perform various functions and communications, for example to perform one or more of the signaling and configurations for SFN communications described herein.

The UEs 115 described herein may be able to communicate with various types of devices, such as other UEs 115 that may sometimes act as relays as well as the network nodes 105 and the network equipment including macro eNBs or gNBs, small cell eNBs or gNBs, or relay base stations, among other examples, as shown in FIG. 1. The UEs 115 may each include a communications manager 101, which may receive one or more signals and communicate with one or more TRPs 180 of a set of TRPs 180 associated with a network node 105.

The UEs 115 and the network nodes 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network node 105, or downlink transmissions from a network node 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network nodes 105, the UEs 115, or both) may have hardware configurations that support communications over a particular carrier bandwidth or may be configurable to support communications over one of a set of carrier bandwidths. In some examples, the wireless communications system 100 may include network nodes 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network nodes 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network node 105 may provide communication coverage via one or more cells, for example a macro cell, a small cell, a hot spot, or other types of cells, or any combination thereof. The term "cell" may refer to a logical communication entity used for communication with a network node 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network node 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network node 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network node 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network node 105 may be movable and therefore provide communication coverage for a moving geographic coverage area 110. In some examples, different geographic coverage areas 110 associated with different technologies may overlap, but the different geographic coverage areas 110 may be supported by the same network node 105. In other examples, the overlapping geographic coverage areas 110 associated with different technologies may be supported by different network nodes 105. The wireless communications system 100 may include, for example, a heterogeneous network in which different types of the network nodes 105 provide coverage for various geographic coverage areas 110 using the same or different radio access technologies.

The wireless communications system 100 may support synchronous or asynchronous operation. For synchronous operation, the network nodes 105 may have similar frame timings, and transmissions from different network nodes 105 may be approximately aligned in time. For asynchronous operation, the network nodes 105 may have different frame timings, and transmissions from different network nodes 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network node 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network node 105. Other UEs 115 in such a group may be outside the geographic coverage area 110 of a network node 105 or be otherwise unable to receive transmissions from a network node 105. In some examples, groups of the UEs 115 communicating via D2D communications may utilize a one-to-many (1:M) system in which each UE 115 transmits to every other UE 115 in the group. In some examples, a network node 105 facilitates the scheduling of resources for D2D communications. In other cases, D2D communications are carried out between the UEs 115 without the involvement of a network node 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network nodes 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network nodes 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network node 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs 180. Each access network transmission entity 145 may include one or more antenna panels. In some configurations, various functions of each access network entity 140 or network node 105 may be distributed across various network devices (e.g., radio heads and ANCs) or consolidated into a single network device (e.g., a network node 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network nodes 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network nodes 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network node 105 or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more network node antennas or antenna arrays may be co-located at an antenna assembly, such as an antenna tower. In some examples, antennas or antenna arrays associated with a network node 105 may be located in diverse geographic locations. A network node 105 may have an antenna array with a number of rows and columns of antenna ports that the network node 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network nodes 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beam forming operations. For example, a network node 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times in different directions. For example, the network node 105 may transmit a signal according to different beamforming weight sets associated with different directions of transmission. Transmissions in different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by a network node 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network node 105 in different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or radio frequency beamforming to generate a combined beam for transmission (e.g., from a network node 105 to a UE 115). The UE 115 may report feedback that indicates precoding weights for one or more beam directions, and the feedback may correspond to a configured number of beams across a system bandwidth or one or more sub-bands. The network node 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network node 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network node 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network node 105 or a core network 130 supporting radio bearers for user plane data. At the physical layer, transport channels may be mapped to physical channels.

Techniques described herein, in addition to or as an alternative to be carried out between UEs 115 and network nodes 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more network nodes 105 may include CUs 160, DUs 165, and RUs 170 and may be referred to as donor network nodes 105 or IAB donors. One or more DUs 165 (e.g., and/or RUs 170) associated with a donor network node 105 may be partially controlled by CUs 160 associated with the donor network node 105. The one or more donor network nodes 105 (e.g., IAB donors) may be in communication with one or more additional network nodes 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to perform one or more of the signaling and configurations for SFN communications described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of network nodes 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to perform one or more of the signaling and configurations for SFN communications described herein.

The UEs 115 and the network nodes 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a network node, such as a network node 105, may include or be associated with one or more TRPs 180 (which may be referred to as radio heads). The network node 105 may relay data and control messages to one or more UEs 115 via the TRPs 180. Some UEs 115 may support SFN communications with the one or more TRPs 180. In some examples, the UEs 115 may be configured to switch between SFN, non-SFN, and other communications configurations based on conditions of the respective UEs 115. For example, a UE 115 may receive one or more signals from at least one TRP 180 of a set of TRPs 180 associated with multi-TRP communications. The one or more signals may indicate a condition corresponding to the UE 115 for the multi-TRP communications. In some examples, the network node 105 may determine the condition and transmit a control message to the UE 115 to indicate the condition. Additionally, or alternatively, the UE 115 may be configured with one or more metrics and corresponding thresholds for determining the condition of the UE 115 based on the signals. The UE 115 may measure the metrics associated with the signals received from each TRP 180 and compare the measurements with the one or more thresholds to determine the condition. The UE 115 may communicate with one or more TRPs 180 of the set of TRPs 180 associated with the network node 105 based on the signals. The UE 115 and the one or more TRPs 180 may communicate according to a multi-TRP communications configuration determined based on the condition.

Figure 2:
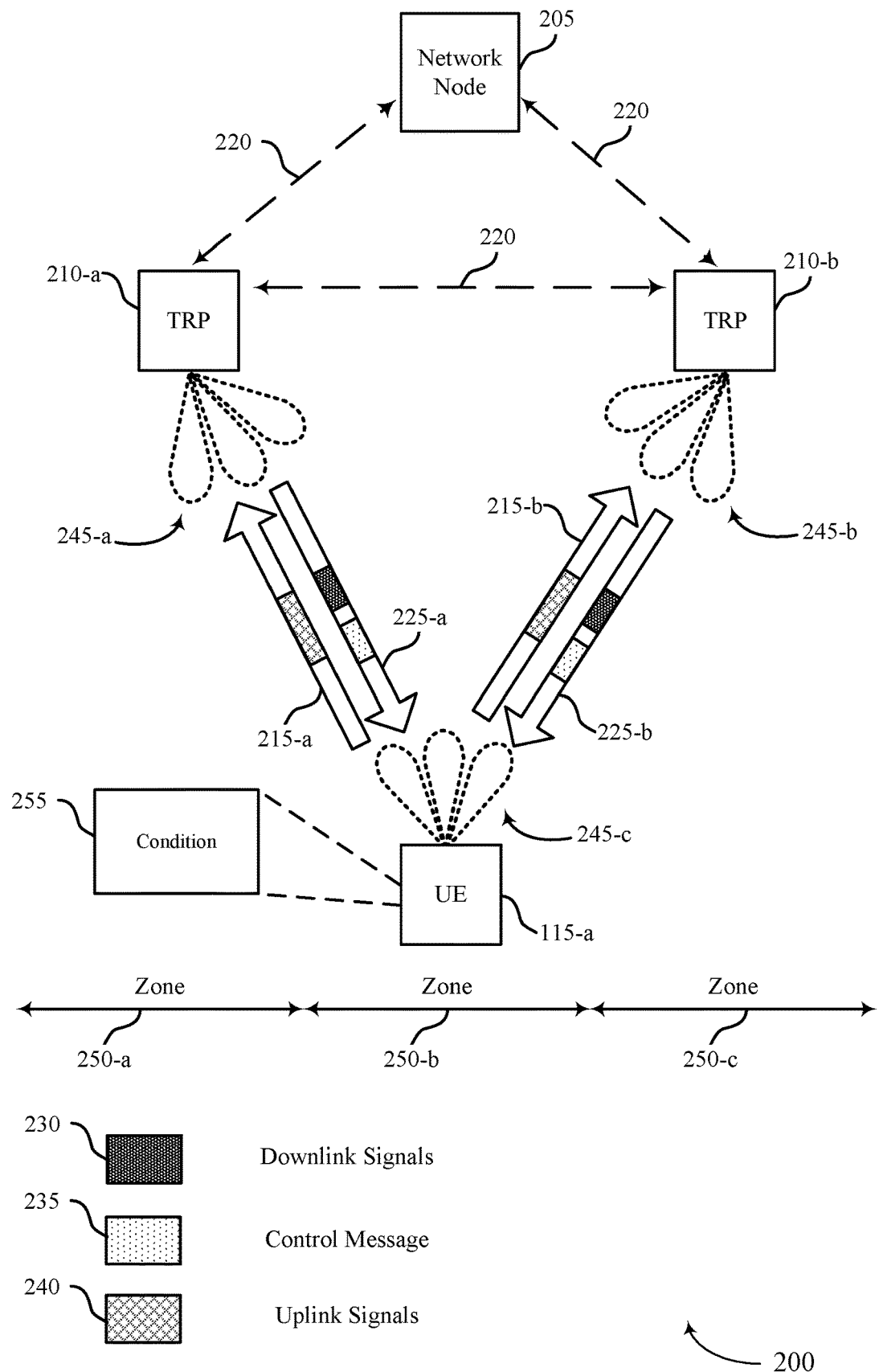
FIG. 2 illustrates an example of a wireless communications system that supports autonomous switching between SFN and non-SFN schemes in accordance with one or more aspects of the present disclosure.

FIG. 2 illustrates an example of a wireless communications system 200 that supports autonomous switching between SFN and non-SFN schemes in accordance with one or more aspects of the present disclosure. In some examples, the wireless communications system 200 may implement or be implemented by aspects of the wireless communications system 100. For example, the wireless communications system 200 may include a UE 115-a, which may represent an example of a UE 115 as described with reference to FIG. 1. The UE 115-a may be in wireless communications with a network node 205, which may represent an example of a network node 105 or some other network entity as described with reference to FIG. 1. The network node 205 may transmit or relay data or control signaling to the UE 115-a via one or more other access network transmission entities, which may be referred to as radio heads or TRPs 210.

The TRPs 210-a and 210-b may be included in or associated with the network node 205. The network node 205 and the TRPs 210 may communicate with each other via one or more backhaul links 220, which may be examples of a backhaul link 120 as described with reference to FIG. 1. The UE 115-a may communicate with the TRP 210-a and the TRP 210-b via respective uplink communication links 215 and downlink communication links 225. For example, the TRP 210-a and the TRP 210-b may transmit, to the UE 115-a, downlink signals 230, a control message 235, or both, via the downlink communication links 225-a and 225-b, respectively. The UE 115-a may transmit one or more uplink signals 240 to the TRP 210-a, the TRP 210-b, or both, via the uplink communication links 215-a and 215-b, respectively. In some examples, the control message 235 may include a resource configuration for SFN communications by the UE 115-a.

The UE 115-a and each of the TRPs 210-a and 210-b may communicate using a set of beams 245. For example, the UE 115-a may communicate using one or more beams of the set of beams 245-c. The UE 115-a may switch between beams based on communications from the TRP 210-a, the TRP 210-b, or both. The TRP 210-a may communicate using one or more beams of the set of beams 245-a and the TRP 210-b may communicate using one or more beams of the set of beams 245-b. Each TRP 210 may switch between beams based on communications from the UE 115-a.

The TRPs 210 may communicate with the UE 115-a using a spatial division multiplexing (SDM) scheme, an FDM scheme, a TDM scheme, or a combination thereof. The TRPs 210 may coordinate a transmission of a downlink channel (e.g., a physical downlink shared channel (PDSCH), a physical downlink control channel (PDCCH), or both), an uplink channel (e.g., a physical uplink shared channel (PUSCH), a PUCCH, or both). For example, an SDM scheme may involve the TRP 210-a and the TRP 210-b performing a joint transmission over a same resource (e.g., over a same set of resource elements and OFDM symbols) based on transmitting different layers, such as spatial layers, with different transmission configuration indication (TCI) states. Additionally, or alternatively, an FDM scheme may involve the TRP 210-a and the TRP 210-b performing the joint transmissions over different frequency resources and overlapping time resources, such as over different sets of resource elements but over a same set of OFDM symbols, based on transmitting different sets of frequency-domain resources (e.g., resource elements) with different TCI states. In some examples of a TDM scheme, the TRP 210-a and the TRP 210-b may perform the joint transmissions over different time resources and overlapping frequency resources, such as over different sets of OFDM symbols and overlapping set of resource elements, based on transmitting different sets of time-domain resources (e.g., OFDM symbols, slots, or mini-slots) with different TCI states.

In some examples, the TRP 210-*a* and the TRP 210-*b* may perform joint transmissions to the UE 115-*a* using an SFN communication configuration, which may also be referred to as a single frequency communication scheme. The SFN communication configuration may be a type of multi-TRP communication scheme in which multiple TRPs 210 may transmit a same data sequence on overlapping time and/or frequency resources. For example, the TRP 210-*a* and the TRP 210-*b* may transmit a same transmission to the UE 115-*a* according to a multi-TRP communications configuration, such as an SDM scheme, an FDM scheme, a TDM scheme, an SFN scheme, or the like, where the downlink transmission is associated with two or more TCI states corresponding to the two or more TRPs 210. In other words, the downlink communication links 225-*a* and 225-*b* may be or may be part of an "SFNed" downlink communication link. A non-SFN communications configuration may correspond to communications in which two or more TPRs 210 refrain from utilizing an "SFNed" downlink communication link, and instead transmit the same or different data or control information to a UE 115 on non-overlapping time and/or frequency resources (e.g., in an asynchronous manner).

The TRP 210-*a* and the TRP 210-*b* may perform joint transmissions to UE 115-*a* according to various types of SFN communication schemes, such as an SFN communication scheme 1 or an SFN communication scheme 2, which are described in further detail with respect to FIG. 3. The UE 115-*a* may use macro diversity or frequency diversity gain to assist in receiving signals from the multiple spatially dispersed TRPs 210. In some cases, one or more TRPs 210 configured to use SFN may use beamforming over a set of beams 245 to transmit a signal over the one or more beams and may alternatively or additionally transmit a signal in an area, direction, or both (e.g., using a single beam). In some examples, the UE 115-*a* may use an SFN scheme if the UE 115-*a* has relatively high mobility, such as in a high speed train (HST) scenario. Further, SFN communications may be useful for some service types, such as broadcast or multicast services.

In some examples, the network node 205 may not indicate, to the UE 115-*a*, that the data is coming from different TRPs 210, which may be referred to as a transparent SFN communication configuration. That is, the UE 115-*a* may assume there is a single channel to receive and demodulate, and the UE 115-*a* may select an effective beam from the set of beams 245-*c* for receiving the transmissions via the channel. In some examples, the channels used by the different TRPs 210 may be relatively different, and it may be beneficial to indicate that the transmission is coming from separate TRPs 210 and corresponding beams. As such, during some SFN communications configurations, the network node 205 may indicate that the transmission is coming from separate TRPs 210 and corresponding beams (e.g., a received beam is a combination of a first beam from the TRP 210-*a* and a second beam from the TRP 210-*b*), which may be referred to as a non-transparent SFN communication configuration. Different schemes for SFN communication configurations are described in further detail with reference to FIGS. 3A and 3B.

The wireless communications system 200 may support one or more multi-TRP communication configurations, single-TRP communication configurations, or both. The multi-TRP communication configurations may be or may support SFN or non-SFN schemes. For example, as illustrated in the wireless communications system 200, the TRP 210-*a*, the TRP 210-*b*, or both may perform a joint transmission (e.g., a multi-TRP transmission) and signaling to the UE 115-*a*, may independently communicate with the UE 115-*a* (e.g., may perform a non-joint transmission or a single TRP based transmission), or both. In some examples of multi-TRP communications, the TRPs 210-*a* and 210-*b* may communicate with the UE 115-*a* and one or more other UEs 115 using different communication schemes (e.g., the SDM, FDM, TDM, multi-TRP scheme, or one of the non-SFN or SFN schemes with or without Doppler shift pre-compensation or a single TRP/TCI based transmission with dynamic transmission point switching) to increase spectral efficiency. In some cases, two or more transmission configuration options or the corresponding transmission modes may be switched dynamically by the network depending on network loading, UE location, channel conditions, UE speed, UE type and other factors.

In some cases, the network node 205 may transmit, via one of the TRP 210-*a* or the TRP 210-*b*, DCI to the UE 115-*a* to indicate a switch between transmission configurations (e.g., between a multi-TRP communication configuration and a single-TRP communication configuration, or the like). A TCI state field in the DCI (e.g., a DCI format 1_1 or 1_2) may indicate the switch between communication configurations. Additionally, or alternatively, the UE 115-*a* and the TRPs 210-*a* and 210-*b* may switch between communication configurations semi-statically based on RRC signaling (e.g., the RRC signaling may indicate a switch between SFN communications, or a switch between other communication configurations).

In the example of FIG. 2, the UE 115-*a* may have relatively high mobility. For example, the UE 115-*a* may be, or may be located in, an HST or some other vehicle, and the UE 115-*a* may move relatively quickly relative to the TRP 210-*a* and the TRP 210-*b* (e.g., the UE 115-*a* may move 10 meters in 0.1 seconds, which may correspond to 800 slots for a 120 kHz SCS). A type of multi-TRP communications configuration the UE 115-*a* supports may be based on a relative distance of the UE 115-*a* to the one or more TRPs 210. As such, if the UE 115-*a* moves relatively quickly, the signaling for indicating dynamic changes in communication configurations may result in relatively large overhead and incur latency. Additionally, or alternatively, in some cases, such as HST scenarios, the UE 115-*a* and one or more other UEs 115 may be in relatively close proximity, and the network node 205 may transmit control signals to each of the UEs 115 to indicate a same communications configuration, which may result in relatively high overhead.

To reduce overhead and improve wireless communications according to one or more multi-TRP communications schemes, the UE 115-*a* may be configured to switch between communication configurations based on a condition 255 of the UE 115-*a*. That is, one or more communication configurations may be configured for each of a set of conditions 255 associated with the UE 115-*a* (e.g., a default MIMO mode for the UE 115-*a* associated with each condition 255). The conditions 255 of the UE 115-*a* may, in some examples, be related to a zone 250. For example, the UE 115-*a* may determine a zone 250 in which the UE 115-*a* is located based on a condition 255 of the UE 115-*a* satisfying a threshold. The condition 255 of the UE 115-*a* may be determined based on measurements of one or more metrics associated with the downlink signals 230 (e.g., SINR, RSRP, doppler, or some other metric), based on positioning information conveyed via the downlink signals 230, or both.

In some examples, the UE 115-*a* may receive a control message 235 indicating a set of communications configurations, and each communications configuration may be associated with a respective condition 255 and corresponding zone 250 of the UE 115-*a* (e.g., one of the zones 250-*a*, 250-*b*, or 250-*c*). For example, each zone 250 may be associated with one of single-TRP communications, multi-TRP communications, SFN communications, or other multi-TRP communications. The multi-TRP communications configurations may be assigned to respective zones 250 based on a location of the zone 250 relative to one or more TRPs 210. For example, in FIG. 2, the zone 250-*a* may correspond to a first region that is closer to the TRP 210-*a* than the TRP 210-*b*, and the zone 250-*a* may thereby correspond to a single-TRP communications configuration with the TRP 210-*a*. For example, a distance between the zone 250-*a*, such as a center point of the zone 250-*a*, and the TRP 210-*a* may be less than a distance between the zone 250-*a* and the TRP 210-*b*, such that the zone 250-*a* may be associated with the TRP 210-*a*. The zone 250-*c* may correspond to a second region that is closer to the TRP 210-*b* than the TRP 210-*a*, and the zone 250-*c* may thereby correspond to a single-TRP communications configuration with the TRP 210-*b*. For example, a distance between the zone 250-*c*, such as a center point of the zone 250-*c*, and the TRP 210-*b* may be less than a distance between the zone 250-*c* and the TRP 210-*a*, such that the zone 250-*c* may be associated with the TRP 210-*b*. The zone 250-*b* may correspond to a region between the TRP 210-*a* and the TRP 210-*b*, and may be associated with an SFN communications configuration associated with both the TRPs 210-*a* and 210-*b* accordingly.

If the UE 115-*a* is in the zone 250-*a* or the zone 250-*c* associated with single-TRP communications, the UE 115-*a* may measure one or more reference signals (e.g., TRSs) transmitted from the respective TRP 210 via a resource set configured for the TRP 210. The UE 115-*a* may maintain one set of time and frequency tracking loops associated with the TRP 210. If the UE 115-*a* is in the zone 250-*b* associated with SFN communications, the UE 115-*a* may measure a first reference signal from the TRP 210-*a* and a second reference signal from the TRP 210-*b*. The UE 115-*a* may maintain one set of time and frequency tracking loops associated with both the first and second reference signals. If the UE 115-*a* is in a zone 250 associated with multi-TRP communications, the UE 115-*a* may measure a first reference signal from a first TRP 210 and a second reference signal from a second TRP 210. The UE 115-*a* may maintain two sets of time and frequency tracking loops in accordance with the multi-TRP communications configuration. For example, the UE 115-*a* may maintain a first set of tracking loops for the first TRP 210 and a second set of tracking loops for the second TRP 210.

The UE 115-*a* may determine which communications configuration to use based on the configuration indicated via the control message 235 and a zone 250 of the UE 115-*a*. As the UE 115-*a* moves within the wireless communications system 200, different conditions 255 of the UE 115-*a* may change, and the UE 115-*a* may switch between zones 250. The UE 115-*a* may thereby switch between communications configurations dynamically based on the zones 250 and without receiving dynamic control signaling from the network node 205 for each switch.

The UE 115-*a* may communicate according to the communications configuration that is associated with a current zone 250 of the UE 115-*a* unless the UE 115-*a* receives a control message 235 or other control signaling that indicates a different communications configuration. For example, if the UE 115-*a* is in the zone 250-*a* associated with single TRP communications with the TRP 210-*a*, and the UE 115-*a* receives DCI or some other signal from the network node 205 that indicates a different communications configuration, such as SFN communications, the UE 115-*a* will switch to communicating according to the indicated SFN communications.

In some examples, the condition 255 of the UE 115-*a* may relate to measurement information associated with the downlink signals 230 (e.g., downlink reference signals, such as TRSs). That is, the UE 115-*a* may determine which zone 250 the UE 115-*a* is in based on whether the measurement information satisfies one or more conditions 255. The UE 115-*a* may receive the control message 235 from the network node 205, and the control message 235 may indicate one or more metrics and thresholds associated with the metrics for determining a condition of the UE 115-*a*. The metrics may include an RSRP metric, an SINR metric, a doppler metric, or any combination thereof. The UE 115-*a* may receive a first reference signal from the TRP 210-*a* and a second reference signal from the TRP 210-*b*. The UE 115-*a* may measure a first metric associated with the first reference signal and a second metric associated with the second reference signal. In some examples, the UE 115-*a* may compare the measured first metric with a first threshold indicated via the control message 235 and the measured second metric with a second threshold indicated via the control message 235. The UE 115-*a* may determine the condition 255 of the UE 115-*a* based on the comparison of each metric with each threshold.

Additionally, or alternatively, the UE 115-*a* may determine a difference between the first measured metric and the second measured metric and compare the difference to a threshold differential indicated via the control message 235 (e.g., via the thresholds associated with the metrics may include the threshold differential). The UE 115-*a* may determine the condition 255 based on the comparison. The UE 115-*a* may transmit uplink signals 240 to the network node 205 via the TRP 210-*a* and/or the TRP 210-*b* to indicate the determined condition 255 of the UE 115-*a*. The UE 115-*a*, the network node 205, or both, may identify which zone 250 corresponds to the condition 255 and which communications scheme is configured for the respective zone 250. If the network node 205 identifies the zone 250, the network node 205 may transmit a downlink signal 230 to indicate the zone 250 and corresponding communications configuration.

In some examples, the network node 205 may determine the condition 255 of the UE 115-*a* based on measurement information. For example, the network node 205 may receive uplink signals 240, which may include uplink reference signals, such as SRSs, from the UE 115-*a*. The UE 115-*a* may transmit the uplink SRSs in response to the one or more downlink signals 230 from the TRP 210-*a* and the TRP 210-*b*. The network node 205 may receive the SRSs and determine the condition and corresponding zone 250 of the UE 115-*a* based on the SRSs. The network node 205 may transmit the control message 235 to the UE 115-*a* to indicate the zone 250 of the UE 115-*a* in response to the uplink SRSs. The UE 115-*a* and the network node 205 may determine which communications configuration to use based on the zone 250.

In some examples, the condition 255 of the UE 115-*a* may relate to positioning information of the UE 115-*a* (e.g., a geographic location of the UE 115-*a*). For example, the downlink signals 230 may include positioning signals, such as GPS or satellite signals. The positioning signals may indicate a geographic location of the UE 115-*a*, which may correspond to a zone 250 of the UE 115-*a*. In some examples, the UE 115-*a*, the network node 205, or both may determine the geographic location of the UE 115-*a* based on the positioning signals and other information, such as a speed of the UE 115-*a*, a trajectory of the UE 115-*a*, or both (e.g., mobility information of the UE 115-*a*). Each zone 250 may represent a region, and the UE 115-*a* may determine which zone 250 includes the geographic location of the UE 115-*a*. In other words, the UE 115-*a* may determine which zone 250 satisfies the condition 255 of the UE 115-*a*, where the condition 255 corresponds to the geographic location of the UE 115-*a*. The UE 115-*a* may transmit an uplink message to the network node 205 to indicate the zone 250. The uplink message may be transmitted via a PUCCH or a MAC-CE and may include on or more fields configured to convey the indication of the zone 250. The UE 115-*a* and the network node 205 may determine the communications configuration corresponding to the identified zone 250, and may communicate accordingly.

The UE 115-*a* and one or more other UEs 115 may, in some examples, be located in a same zone 250. For example, the UE 115-*a* may be in an HST with multiple other UEs 115. In such cases, the network node 205 may identify the multiple UEs 115 in the same zone 250 and treat the UEs 115 jointly. That is, the network node 205 may transmit a broadcast message to the multiple UEs 115 to indicate a condition 255 and corresponding communications scheme for each of the UEs 115. By transmitting a broadcast message to indicate the condition 255 for multiple UEs 115, the network node 205 may refrain from transmitting multiple control messages 235 or downlink signals 230, which may reduce latency and overhead.

The UE 115-*a* may thereby be configured with a set of one or more communications configurations that correspond to respective conditions 255 of the UE 115-*a* being satisfied. The UE 115-*a* may switch between communications configurations based on a condition 255 of the UE 115-*a*, which may reduce overhead and latency as compared with communications systems in which the UE 115-*a* switches between communications configurations based on downlink control signaling. In some examples, the UE 115-*a* may support DCI-based switches between communications configurations in addition to the condition-based switching. That is, if the UE 115-*a* receives DCI or other control signaling that indicates a switch between communications configurations, the UE 115-*a* may switch to the indicated communications configuration irrespective of a current condition 255 or zone 250 of the UE 115-*a*.

Figure 3A:
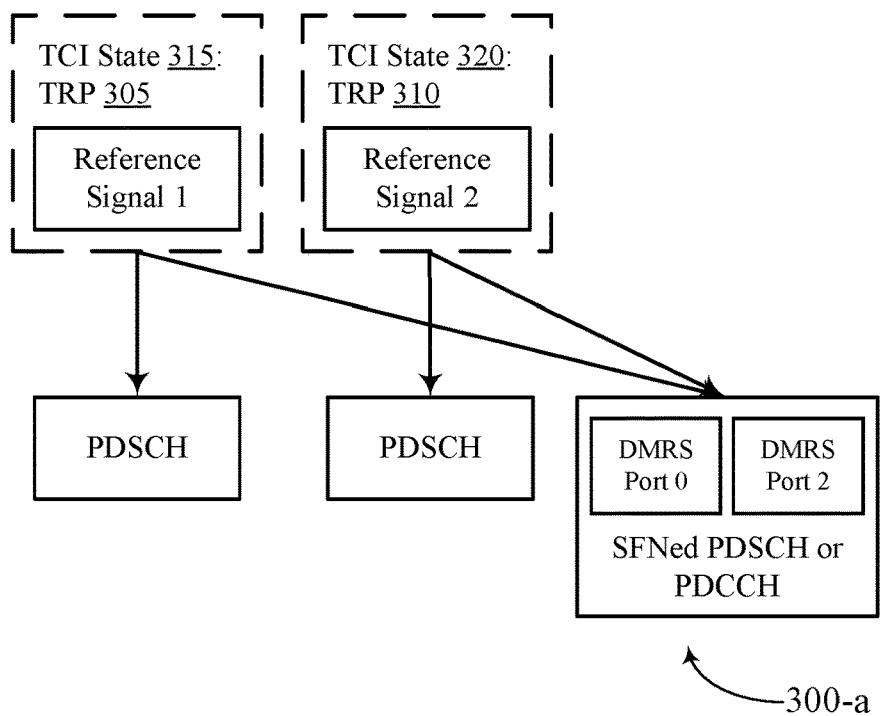
FIGS. 3A and 3B illustrate examples of communication scheme diagrams that support autonomous switching between SFN and non-SFN schemes in accordance with one or more aspects of the present disclosure.
Figure 3B:
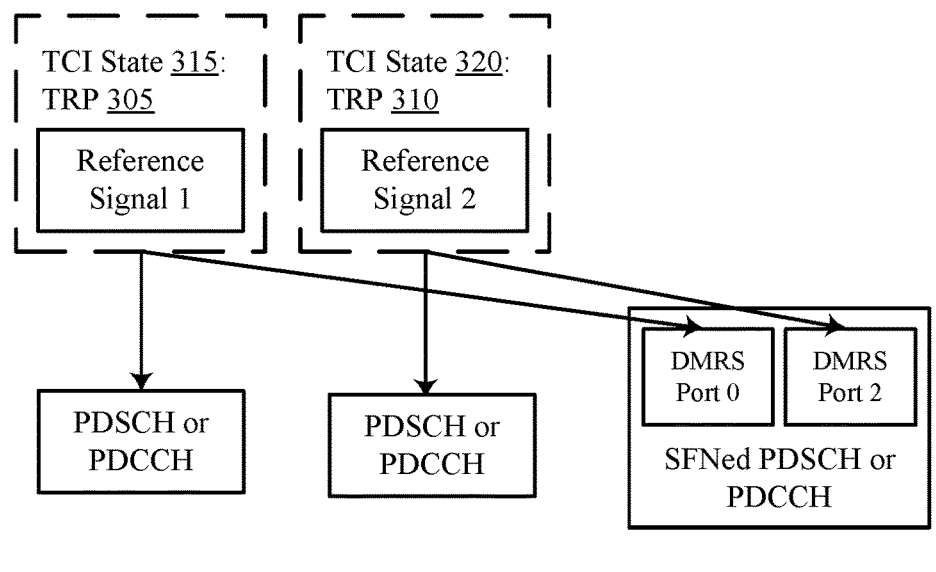

FIGS. 3A and 3B illustrate examples of communication scheme diagrams 300 that support autonomous switching between SFN and non-SFN schemes in accordance with one or more aspects of the present disclosure. In some examples, the communication scheme diagrams 300-*a* and 300-*b* may be implemented to realize aspects of the wireless communications system 100 or the wireless communications system 200. For example, a TRP 305, a TRP 310, or both, which may be examples of TRPs 210 as described with reference to FIG. 2 (e.g., multi-TRPs), and one or more UEs 115 may employ one or more SFN schemes illustrated by the communication scheme diagrams 300-*a* and 300-*b*, as described with reference to FIGS. 1 and 2. A network node 105 may dynamically transmit a joint demodulation reference signal (DMRS) configuration and transmission mode configuration. The transmission mode configuration may relate to a transmission mode for communicating with one or more TRPs 210. In some cases, the TRP 305, the TRP 310, or both may transmit one or more data messages to a UE 115 using an SFN scheme of the SFN schemes based on the joint DMRS configuration and transmission mode indication. In some cases, the communication scheme diagrams 300-*a* and 300-*b* may illustrate joint downlink transmissions to the UE 115 from a TRP 305 applying a TCI state 315 and from a TRP 310 applying a TCI state 320.

The communication scheme diagram 300-*a* illustrates an SFN scheme 1. In such an SFN scheme 1, the TRP 305 and the TRP 310 may transmit two separate reference signals (e.g., a reference signal 1 and a reference signal 2, respectively). Each reference signal may correspond to a single-TRP PDSCH transmission and a corresponding TCI state of the TRP. The reference signals may also be associated with a joint "SFNed" PDSCH or, in some examples PDCCH. That is, each of the reference signal 1 and the reference signal 2 may serve as a source reference signal for demodulating a PDCCH or a PDSCH that is transmitted in an SFN manner. Each DMRS port (e.g., DMRS port 0 and DMRS port 2) or data layer of the "SFNed" PDSCH may be associated with both the TCI state 315 and the TCI state 320. In other words, the TRP 305 and the TRP 310 may transmit reference signals (such as TRSs) in a TRP-specific or non-SFN manner while the associated DMRS (e.g., for demodulating the channel) and PDSCH or PDCCH from the TRPs are transmitted in an SFN manner.

The communication scheme diagram 300-*b* illustrates an SFN scheme 2. In such an SFN scheme 2, the TRP 305 and the TRP 310 may transmit two separate reference signals (e.g., a reference signal 1 and a reference signal 2, respectively). Each reference signal may correspond to a single-TRP PDSCH transmission. The reference signals may also be associated with a joint PDSCH or PDCCH transmission in which each data layer of the joint PDSCH or PDCCH is associated with both of the TCI state 315 and the TCI state 320 while each DMRS port of the joint PDSCH or PDCCH is associated with either the TCI state 315 or the TCI state 320 (e.g., not both). For example, a DMRS port 0 of the joint PDSCH may be associated with the TCI state 315 (and not with the TCI state 320) and a DMRS port 2 of the joint PDSCH may be associated with the TCI state 320 (and not with the TCI state 315). In some examples, the DMRS port 0 may be quasi-colocated (QCLed) with the TCI state 315 and the DMRS port 2 may be QCLed with the TCI state 320. The data layers of the joint PDSCH may be associated with both the TCI state 315 and the TCI state 320 through the DMRS ports. In other words, the TRP 305 and the TRP 310 may transmit reference signals (such as TRSs) and DMRSs in a TRP-specific or non-SFN manner while the associated with PDSCH (e.g., data layers) from the TRPs is transmitted in an SFN manner.

In some cases, a UE 115 and a network node 105 may communicate using one or more TRPs, such as the TRP 305, the TRP 310, or both, in an HST scenario. The UE 115 may identify a transmission scheme, such as SFN scheme 1, SFN scheme 2, a multi-TRP SDM scheme, or a non-SFN scheme (e.g., a single-TRP scheme) based on one or more conditions associated with the UE 115, as described with reference to FIG. 2. For example, the UE 115 may be configured with a set of multi-TRP communications configurations that each correspond to a respective condition of the UE 115. If the UE 115 determines a change in a condition of the UE 115, the UE 115 may switch communications configurations. The condition of the UE 115 may correspond to a zone of the UE 115, a geographical location of the UE 115, or measurement information associated with signals received by the UE 115, as described with reference to FIG. 2. The UE 115 may additionally, or alternatively receive DCI or other control signals that may dynamically indicate a communication configuration for the UE 115 to use. The UE 115 may use the communication configuration to receive one or more downlink transmissions from the network node 105 via the TRP 305, the TRP 310, or both.

Figure 4:
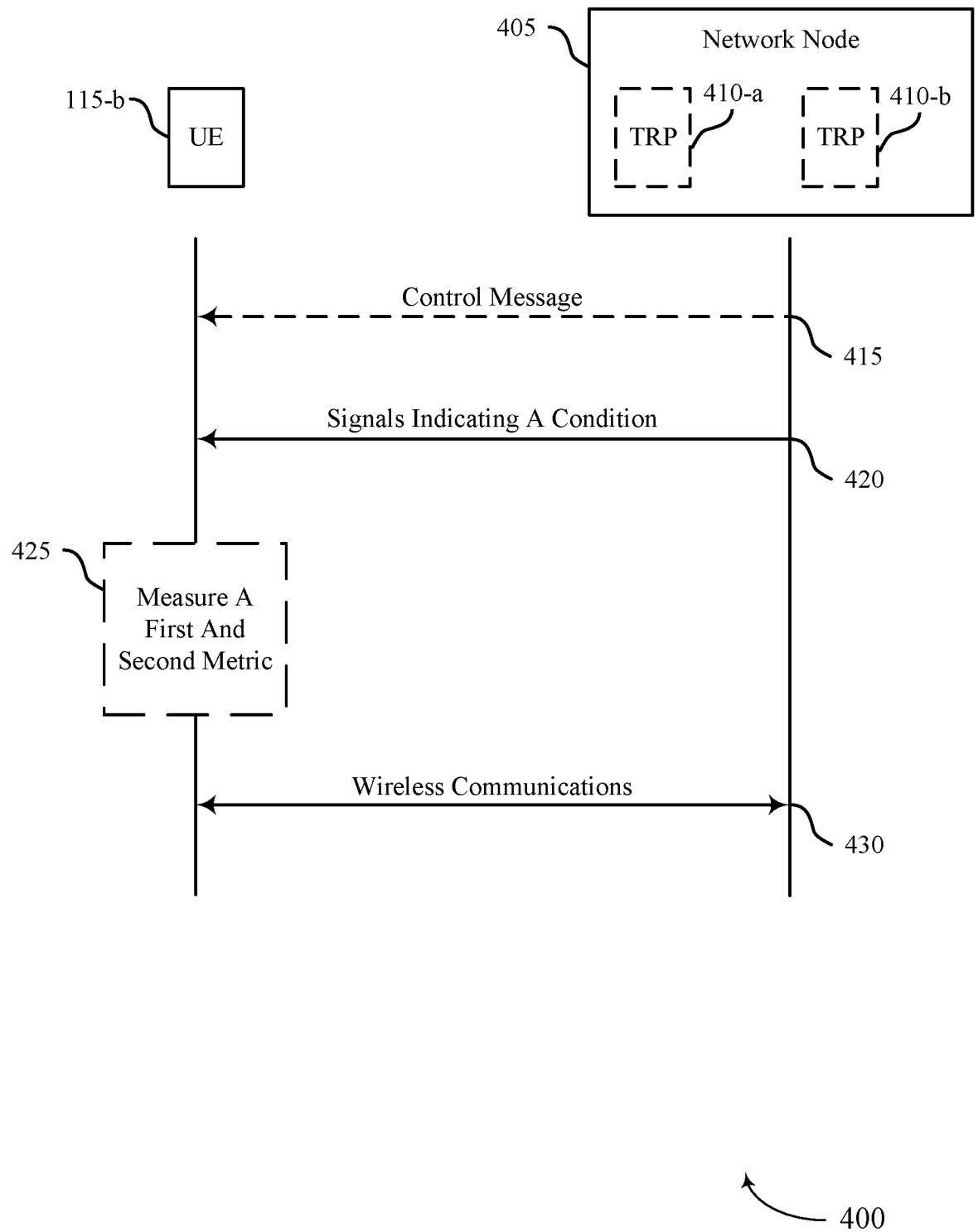
FIG. 4 illustrates an example of a process flow that supports autonomous switching between SFN and non-SFN schemes in accordance with one or more aspects of the present disclosure.

FIG. 4 illustrates an example of a process flow 400 that supports autonomous switching between SFN and non-SFN schemes in accordance with one or more aspects of the present disclosure. The process flow 400 may implement aspects of the wireless communications systems 100 and 200 or may be implemented by aspects of the wireless communications systems 100 and 200 as described with reference to FIGS. 1 and 2, respectively. For example, the process flow 400 may implement or be implemented by a network node 405 and a UE 115-*b*, which may be examples of a network node (e.g., a base station, a TRP, or a network node including or associated with one or more TRPs) and a UE as described with reference to FIGS. 1 through 3. The network node 405 may include a set of TRPs 410 including at least the TRP 410-*a* and the TRP 410-*b*, the set of TRPs 410 associated with multi-TRP communications.

In the following description of the process flow 400, the operations between the network node 405 and the UE 115-*b* may be performed in different orders or at different times. Some operations may also be left out of the process flow 400, or other operations may be added. Although the network node 405 and the UE 115-*b* are shown performing the operations of the process flow 400, some aspects of some operations may also be performed by one or more other wireless devices.

At 415, in some examples, the network node 405 may transmit a control message to the UE 115-*b*. The control message may indicate a first metric, a second metric, and one or more thresholds associated with the first metric and the second metric for determining the condition corresponding to the UE 115-*b* for the multi-TRP communications.

At 420, the network node 405 may transmit, via at least one TRP 410 of the TRPs 410-*a* and 410-*b*, one or more signals to the UE 115-*b*. The one or more signals may indicate a condition corresponding to the UE 115-*b* for a multi-TRP communications configuration. In some examples, the one or more signals may include reference signals, positioning signals, or both. The condition may correspond to a zone of the UE 115-*b*, a geographical location of the UE 115-*b* (e.g., based on positioning information), measurement information associated with the one or more signals received by the UE 115-*b*, or any combination thereof.

At 425, in some examples, the UE 115-*b* may measure the first metric associated with a first signal of the one or more signals. The first signal may be received from the TRP 410-*a*. The UE 115-*b* may additionally, or alternatively measure the second metric associated with a second signal of the one or more signals. The second signal may be received from the TRP 410-*b*.

At 430, the UE 115-*b* may communicate with one or more of the TRP 410-*a*, the TRP 410-*b*, and other TRPs 410 of the network node 405 based on the one or more signals. The UE 115-*b* and the TRPs 410 may communicate according to the multi-TRP communications configuration determined based on the condition. In some examples, the UE 115 may determine the condition and the corresponding multi-TRP communications configuration based on measuring the first metric and the second metric.

Figure 5:
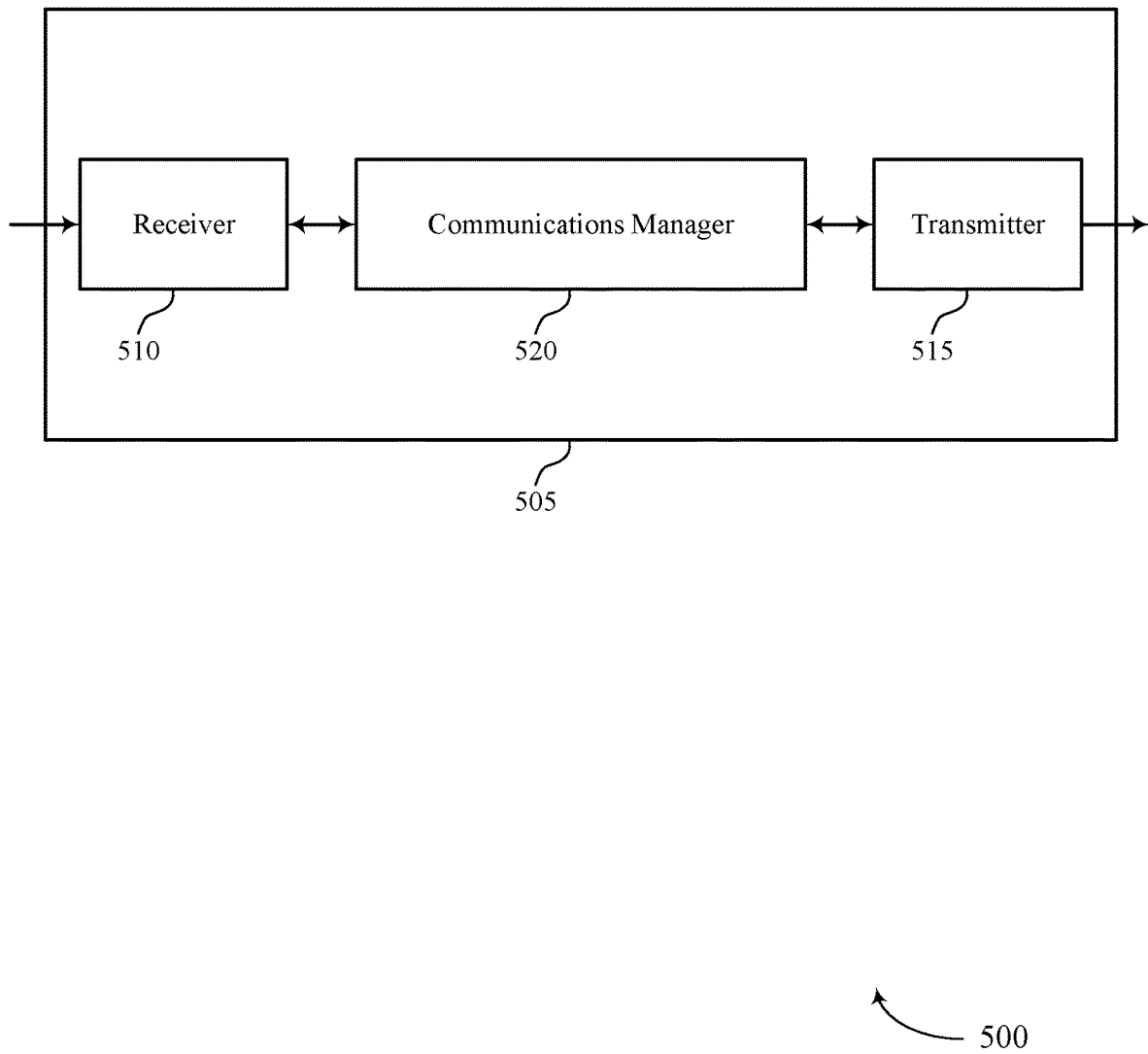
FIGS. 5 and 6 show block diagrams of devices that support autonomous switching between SFN and non-SFN schemes in accordance with one or more aspects of the present disclosure.

FIG. 5 shows a block diagram 500 of a device 505 that supports autonomous switching between SFN and non-SFN schemes in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to autonomous switching between SFN and non-SFN schemes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to autonomous switching between SFN and non-SFN schemes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of autonomous switching between SFN and non-SFN schemes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving one or more signals from at least one TRP of a set of TRPs associated with one or more multi-TRP communications configurations, the one or more signals indicating a condition corresponding to the UE for a multi-TRP communications configuration of the one or more multi-TRP communications configurations. The communications manager 520 may be configured as or otherwise support a means for communicating with one or more TRPs of the set of TRPs associated with multi-TRP communications based on the one or more signals, the communicating according to the multi-TRP communications configuration determined based on the condition.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources. The processor of the device 505 may be configured to switch between multi-TRP communications configurations based on conditions of the device 505, which may reduce processing and power consumption and improve utilization of communication resources as compared with systems in which the processor may receive and decode control signals to indicate switches between communication configurations. Additionally, or alternatively, the communications configurations utilized by the processor of the device 505 may be based on a location of the device 505 relative to one or more TRPs, which may provide for more accurate selection of communication configurations to reduce processing and latency.

Figure 6:
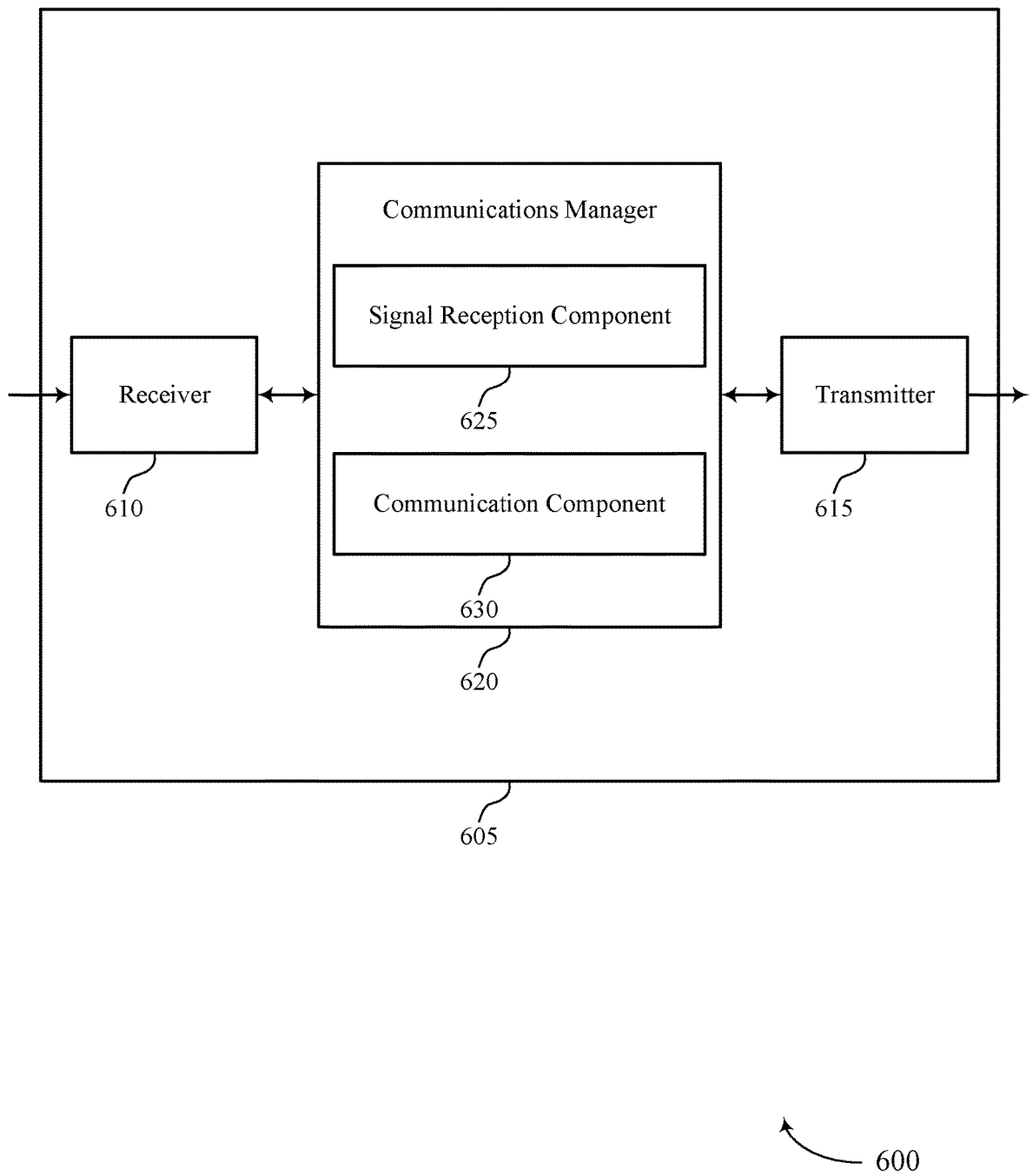

FIG. 6 shows a block diagram 600 of a device 605 that supports autonomous switching between SFN and non-SFN schemes in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to autonomous switching between SFN and non-SFN schemes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to autonomous switching between SFN and non-SFN schemes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of autonomous switching between SFN and non-SFN schemes as described herein. For example, the communications manager 620 may include a signal reception component 625 a communication component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The signal reception component 625 may be configured as or otherwise support a means for receiving one or more signals from at least one TRP of a set of TRPs associated with one or more multi-TRP communications configurations, the one or more signals indicating a condition corresponding to the UE for a multi-TRP communications configuration of the one or more multi-TRP communications configurations. The communication component 630 may be configured as or otherwise support a means for communicating with one or more TRPs of the set of TRPs associated with multi-TRP communications based on the one or more signals, the communicating according to the multi-TRP communications configuration determined based on the condition.

Figure 7:
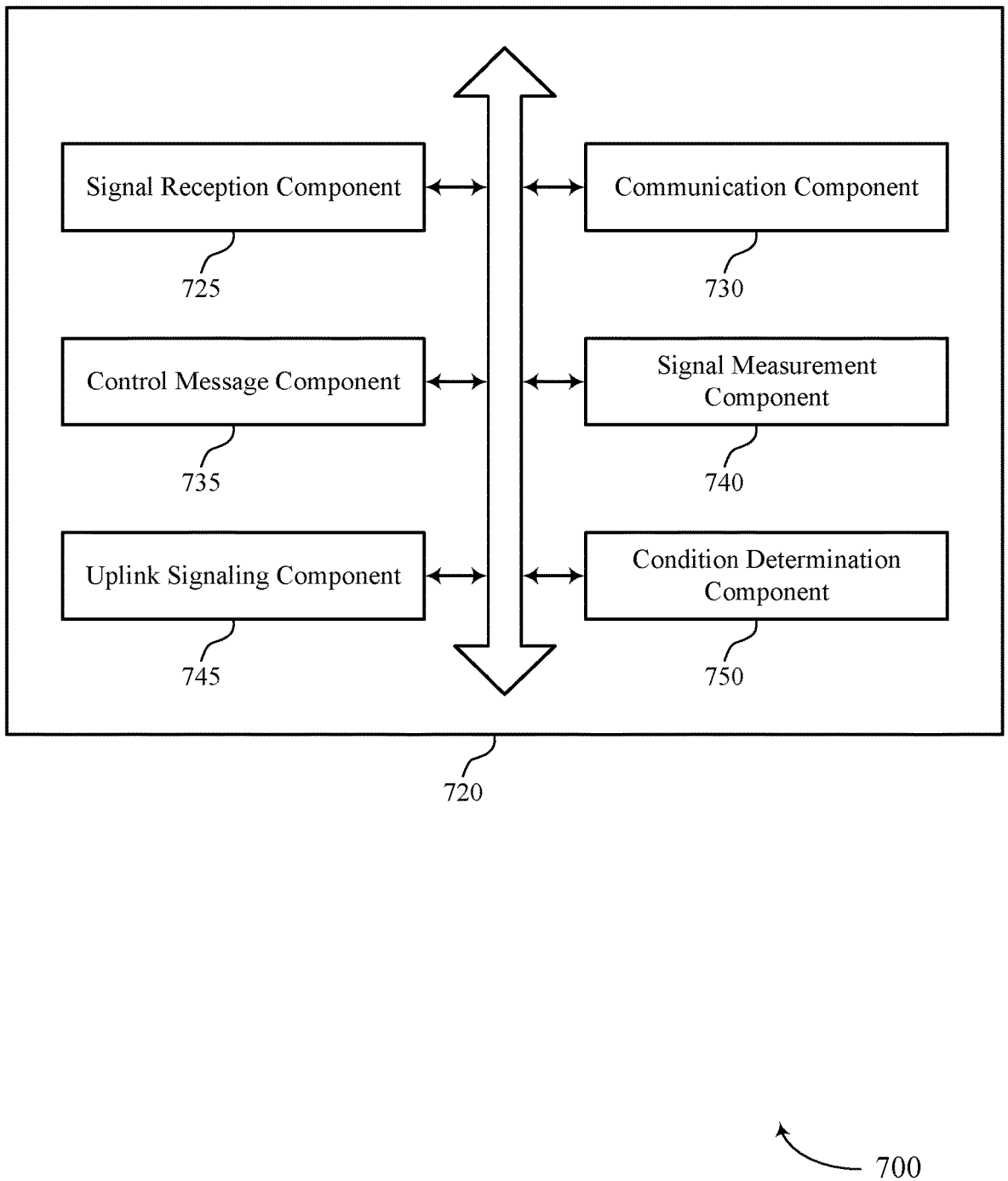
FIG. 7 shows a block diagram of a communications manager that supports autonomous switching between SFN and non-SFN schemes in accordance with one or more aspects of the present disclosure.

FIG. 7 shows a block diagram 700 of a communications manager 720 that supports autonomous switching between SFN and non-SFN schemes in accordance with one or more aspects of the present disclosure. The communications manager 720 may be an example of aspects of a communications manager 520, a communications manager 620, or both, as described herein. The communications manager 720, or various components thereof, may be an example of means for performing various aspects of autonomous switching between SFN and non-SFN schemes as described herein. For example, the communications manager 720 may include a signal reception component 725, a communication component 730, a control message component 735, a signal measurement component 740, an uplink signaling component 745, a condition determination component 750, or any combination thereof. Each of these components may communicate, directly or indirectly, with one another (e.g., via one or more buses).

The communications manager 720 may support wireless communications at a UE in accordance with examples as disclosed herein. The signal reception component 725 may be configured as or otherwise support a means for receiving one or more signals from at least one TRP of a set of TRPs associated with one or more multi-TRP communications configurations, the one or more signals indicating a condition corresponding to the UE for a multi-TRP communications configuration of the one or more multi-TRP communications configurations. The communication component 730 may be configured as or otherwise support a means for communicating with one or more TRPs of the set of TRPs associated with multi-TRP communications based on the one or more signals, the communicating according to the multi-TRP communications configuration determined based on the condition.

In some examples, the control message component 735 may be configured as or otherwise support a means for receiving a control message indicating a first metric, a second metric, and one or more thresholds associated with the first metric and the second metric for determining the condition corresponding to the UE for the multi-TRP communications configuration. In some examples, the signal measurement component 740 may be configured as or otherwise support a means for measuring the first metric associated with a first signal of the one or more signals, the first signal received from the at least one TRP. In some examples, the signal measurement component 740 may be configured as or otherwise support a means for measuring the second metric associated with a second signal of the one or more signals, the second signal received from a second TRP of the set of TRPs.

In some examples, the signal measurement component 740 may be configured as or otherwise support a means for comparing a difference between the first metric and the second metric with a threshold differential associated with the first metric and the second metric, the one or more thresholds including the threshold differential. In some examples, the uplink signaling component 745 may be configured as or otherwise support a means for transmitting uplink signaling indicating the condition based on comparing the difference with the threshold differential.

In some examples, the signal measurement component 740 may be configured as or otherwise support a means for comparing the first metric with a first threshold, where the one or more thresholds include the first threshold. In some examples, the signal measurement component 740 may be configured as or otherwise support a means for comparing the second metric with a second threshold, where the one or more thresholds include the second threshold. In some examples, the uplink signaling component 745 may be configured as or otherwise support a means for transmitting uplink signaling indicating the condition based on comparing the first metric with the first threshold and comparing the second metric with the second threshold.

In some examples, the first metric, the second metric, or both correspond to a RSRP, an SINR, a doppler measurement, or a combination thereof.

In some examples, the uplink signaling component 745 may be configured as or otherwise support a means for transmitting an uplink reference signal based on the one or more signals. In some examples, the control message component 735 may be configured as or otherwise support a means for receiving a control message indicating the condition in response to the uplink reference signal.

In some examples, the one or more signals include TRSs. In some examples, the condition corresponds to a location of the UE relative to the set of TRPs, the location determined based on the TRSs.

In some examples, the one or more signals may include positioning signals, and the condition determination component 750 may be configured as or otherwise support a means for determining a geographic location of the UE based on the positioning signals. In some examples, the uplink signaling component 745 may be configured as or otherwise support a means for transmitting, via an uplink control channel, an uplink signal indicating the geographic location of the UE, the geographic location corresponding to the condition and the multi-TRP communications configuration.

In some examples, the uplink signaling component 745 may be configured as or otherwise support a means for transmitting a PUCCH or a MAC-CE indicating the geographic location of the UE. In some examples, the condition determination component 750 may be configured as or otherwise support a means for determining the geographic location of the UE based on a speed of the UE, or a trajectory of the UE, or both, the UE moving relative to the set of TRPs.

In some examples, the control message component 735 may be configured as or otherwise support a means for receiving a broadcast message indicating the multi-TRP communications configuration for the UE and one or more other UEs, the broadcast message based on the condition being common to the UE and the one or more other UEs.

In some examples, the control message component 735 may be configured as or otherwise support a means for receiving a control message indicating the one or more multi-TRP communications configurations including the multi-TRP communications configuration, each multi-TRP communications configuration of the one or more multi-TRP communications configurations corresponding to a respective condition.

In some examples, the respective condition corresponds to a respective zone of the UE relative to the set of TRPs. In some examples, a first zone associated with a first region that is associated with a first TRP of the set of TRPs corresponds to a single TRP communications configuration with the first TRP. In some examples, a second zone associated with a second region that is between the first TRP and a second TRP of the set of TRPs corresponds to an SFN communications scheme with the first TRP and the second TRP.

In some examples, the control message component 735 may be configured as or otherwise support a means for receiving DCI indicating a second multi-TRP communications configuration. In some examples, the communication component 730 may be configured as or otherwise support a means for communicating with the one or more TRPs according to the second multi-TRP communications configuration in accordance with the DCI.

In some examples, the multi-TRP communications configuration includes one or more of an SFN communications scheme, a multi-TRP communications scheme, or a non-SFN communications scheme.

Figure 8:
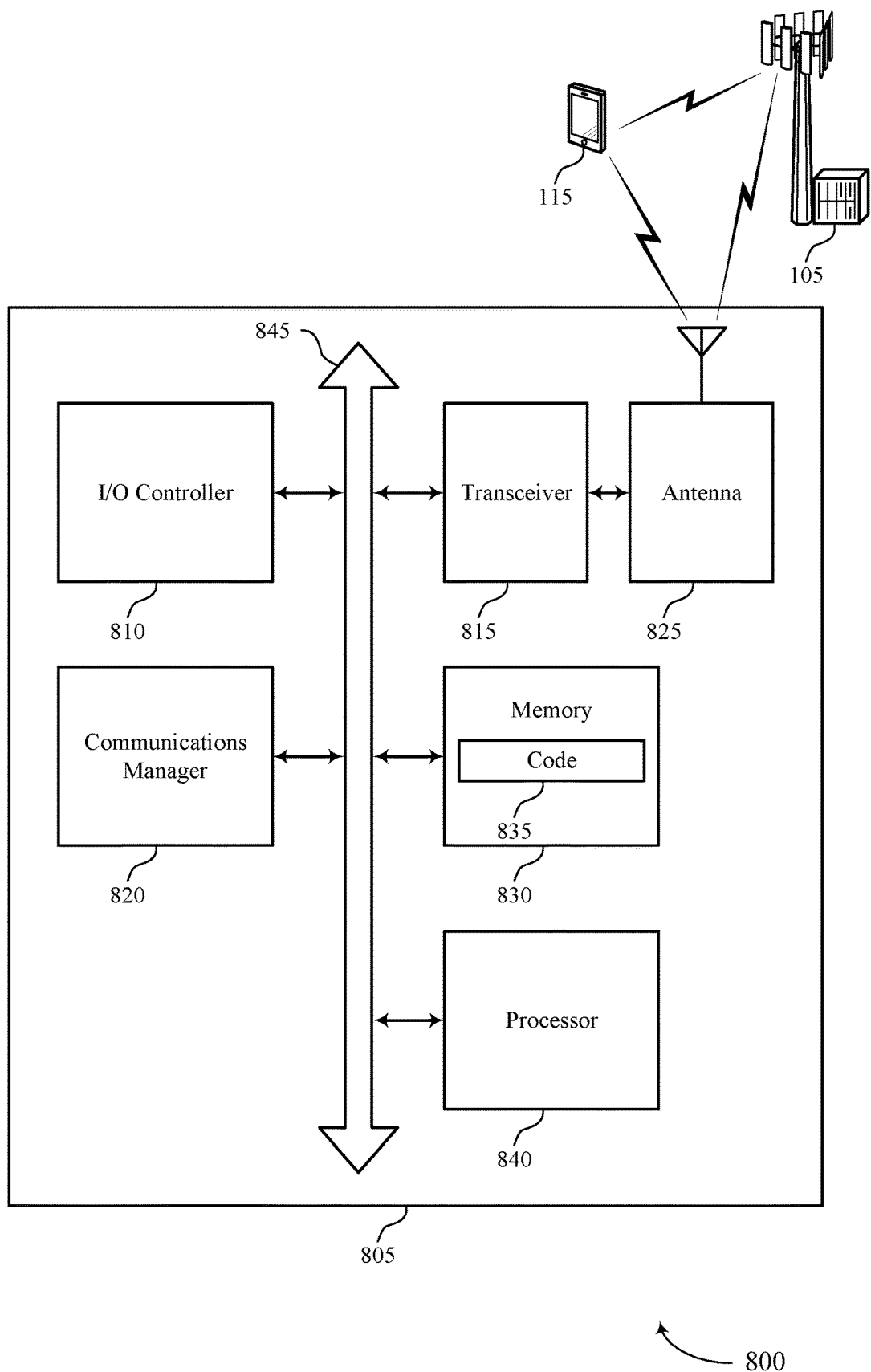
FIG. 8 shows a diagram of a system including a device that supports autonomous switching between SFN and non-SFN schemes in accordance with one or more aspects of the present disclosure.

FIG. 8 shows a diagram of a system 800 including a device 805 that supports autonomous switching between SFN and non-SFN schemes in accordance with one or more aspects of the present disclosure. The device 805 may be an example of or include the components of a device 505, a device 605, or a UE 115 as described herein. The device 805 may communicate wirelessly with one or more network nodes 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting autonomous switching between SFN and non-SFN schemes). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving one or more signals from at least one TRP of a set of TRPs associated with one or more multi-TRP communications configurations, the one or more signals indicating a condition corresponding to the UE for a multi-TRP communications configuration of the one or more multi-TRP communications configurations. The communications manager 820 may be configured as or otherwise support a means for communicating with one or more TRPs of the set of TRPs associated with multi-TRP communications based on the one or more signals, the communicating according to the multi-TRP communications configuration determined based on the condition.

By including or configuring the communications manager 820 in accordance with examples as described herein, the device 805 may support techniques for improved communication reliability, reduced latency, and more efficient utilization of communication resources. The device 805 may be configured to switch between multi-TRP communications configurations based on conditions of the device 805, which may reduce overhead and latency and improve utilization of communication resources as compared with systems in which the device 805 may receive control signals to indicate switches between communication configurations. In some examples, the device 805 and one or more other devices 805 may correspond to a same condition. For example, the devices may be in a same zone or geographical region. In such cases, the network may transmit broadcast signaling to the device 805 and the one or more other devices, which may improve utilization of communication resources, reduce overhead, and improve coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of autonomous switching between SFN and non-SFN schemes as described herein, or the processor 840 and the memory 830 may be otherwise configured to perform or support such operations.

Figure 9:
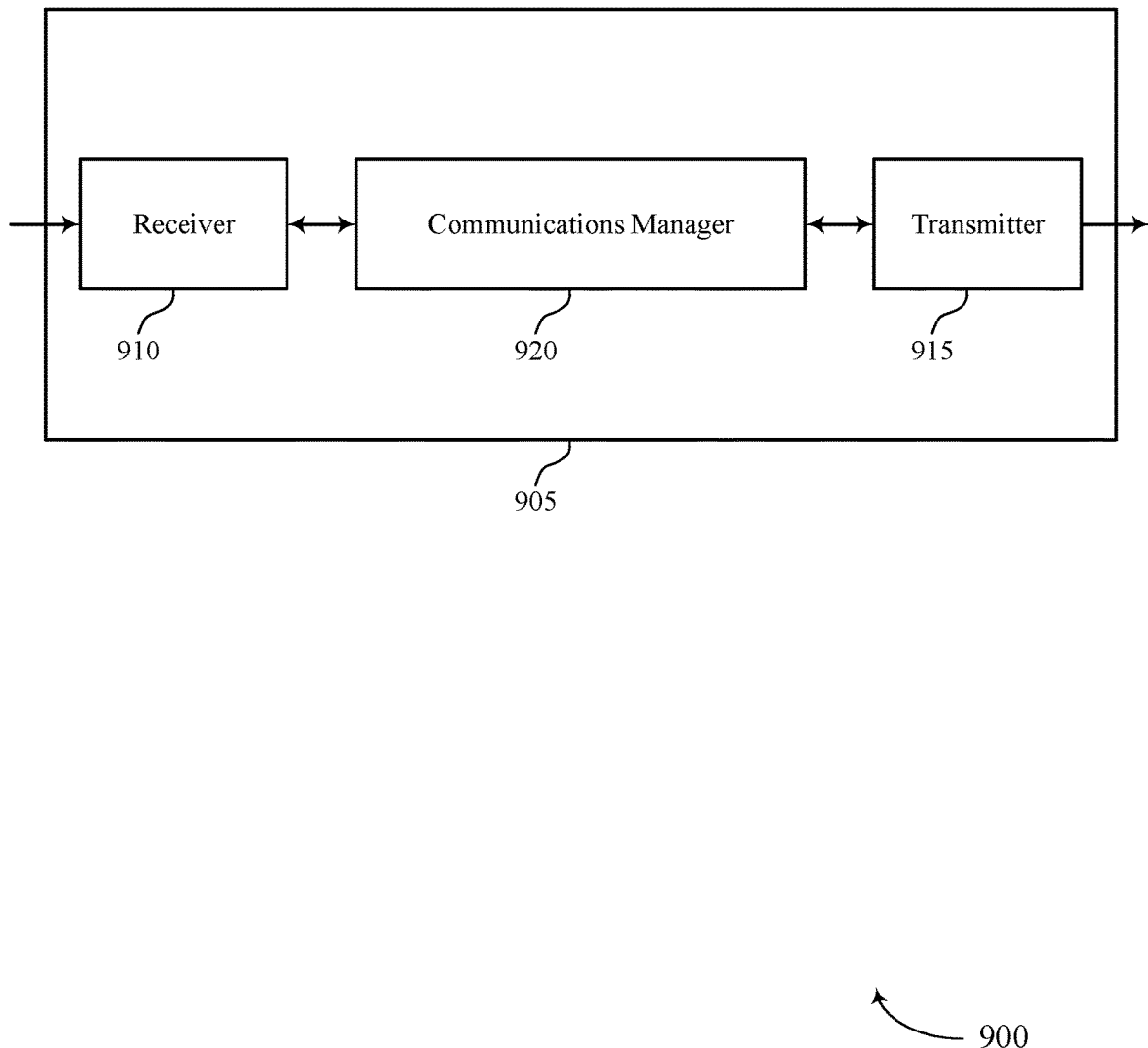
FIGS. 9 and 10 show block diagrams of devices that support autonomous switching between SFN and non-SFN schemes in accordance with one or more aspects of the present disclosure.

FIG. 9 shows a block diagram 900 of a device 905 that supports autonomous switching between SFN and non-SFN schemes in accordance with one or more aspects of the present disclosure. The device 905 may be an example of aspects of a network node 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to autonomous switching between SFN and non-SFN schemes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to autonomous switching between SFN and non-SFN schemes). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of autonomous switching between SFN and non-SFN schemes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network node including a set of TRPs associated with one or more multi-TRP communications configurations in accordance with examples as disclosed herein. For example, the communications manager 920 may be configured as or otherwise support a means for transmitting, via at least one TRP of the set of TRPs, one or more signals to a UE, the one or more signals indicating a condition corresponding to the UE for a multi-TRP communications configuration of the one or more multi-TRP communications configurations. The communications manager 920 may be configured as or otherwise support a means for communicating with the UE via one or more TRPs of the set of TRPs associated with multi-TRP communications based on the one or more signals, the communicating according to the multi-TRP communications configuration determined based on the condition.

Figure 10:
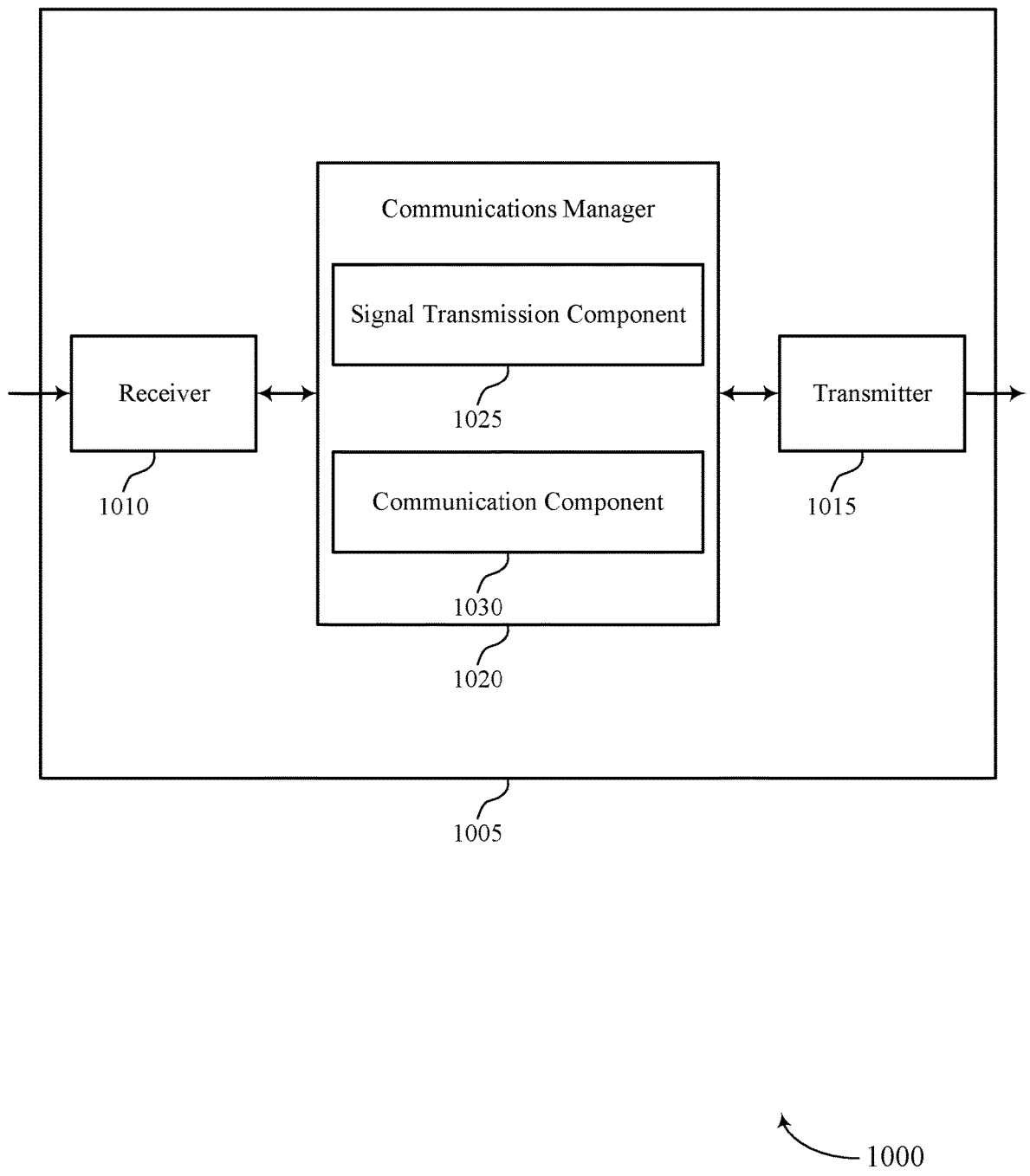

FIG. 10 shows a block diagram 1000 of a device 1005 that supports autonomous switching between SFN and non-SFN schemes in accordance with one or more aspects of the present disclosure. The device 1005 may be an example of aspects of a device 905 or a network node 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to autonomous switching between SFN and non-SFN schemes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to autonomous switching between SFN and non-SFN schemes). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of autonomous switching between SFN and non-SFN schemes as described herein. For example, the communications manager 1020 may include a signal transmission component 1025 a communication component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network node including a set of TRPs associated with one or more multi-TRP communications configurations in accordance with examples as disclosed herein. The signal transmission component 1025 may be configured as or otherwise support a means for transmitting, via at least one TRP of the set of TRPs, one or more signals to a UE, the one or more signals indicating a condition corresponding to the UE for a multi-TRP communications configuration of the one or more multi-TRP communications configurations. The communication component 1030 may be configured as or otherwise support a means for communicating with the UE via one or more TRPs of the set of TRPs associated with multi-TRP communications based on the one or more signals, the communicating according to the multi-TRP communications configuration determined based on the condition.

Figure 11:
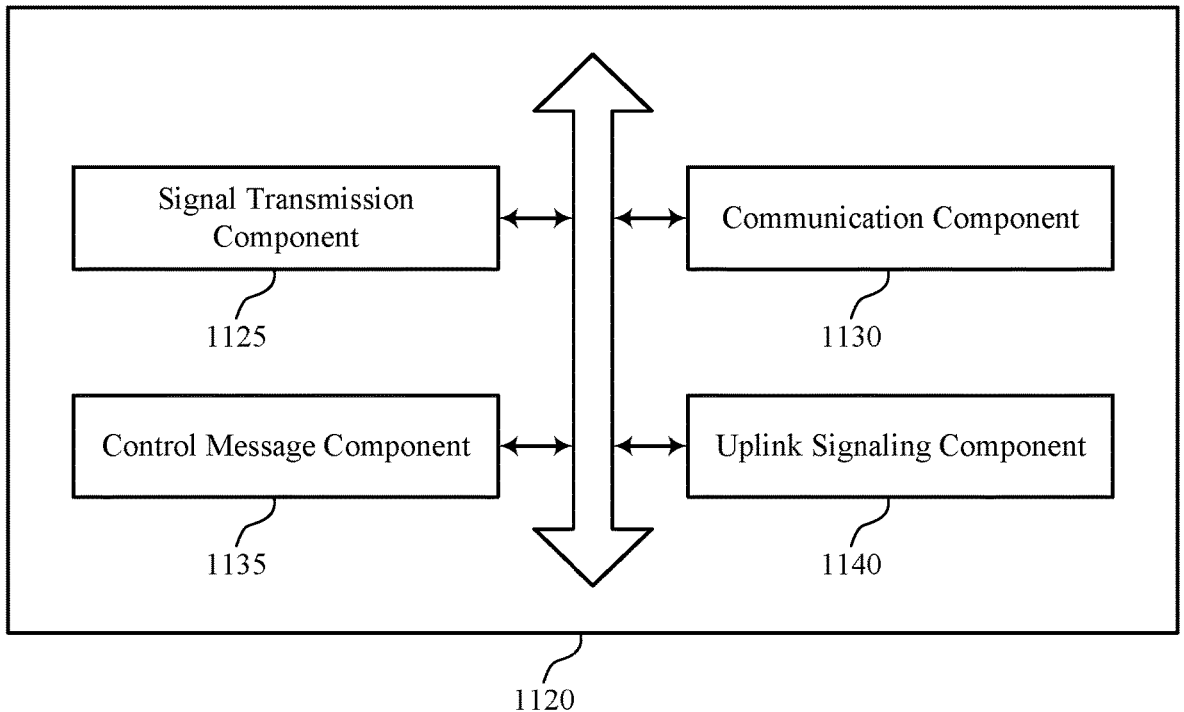
FIG. 11 shows a block diagram of a communications manager that supports autonomous switching between SFN and non-SFN schemes in accordance with one or more aspects of the present disclosure.

FIG. 11 shows a block diagram 1100 of a communications manager 1120 that supports autonomous switching between SFN and non-SFN schemes in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of autonomous switching between SFN and non-SFN schemes as described herein. For example, the communications manager 1120 may include a signal transmission component 1125, a communication component 1130, a control message component 1135, an uplink signaling component 1140, or any combination thereof. Each of these components may communicate, directly or indirectly, with one another (e.g., via one or more buses).

The communications manager 1120 may support wireless communications at a network node including a set of TRPs associated with one or more multi-TRP communications configurations in accordance with examples as disclosed herein. The signal transmission component 1125 may be configured as or otherwise support a means for transmitting, via at least one TRP of the set of TRPs, one or more signals to a UE, the one or more signals indicating a condition corresponding to the UE for a multi-TRP communications configuration of the one or more multi-TRP communications configurations. The communication component 1130 may be configured as or otherwise support a means for communicating with the UE via one or more TRPs of the set of TRPs associated with multi-TRP communications based on the one or more signals, the communicating according to the multi-TRP communications configuration determined based on the condition.

In some examples, the control message component 1135 may be configured as or otherwise support a means for transmitting, to the UE, a control message indicating a first metric, a second metric, and one or more thresholds associated with the first metric and the second metric for determining the condition corresponding to the UE for the multi-TRP communications configuration.

In some examples, the uplink signaling component 1140 may be configured as or otherwise support a means for receiving uplink signaling from the UE indicating the condition based on the one or more signals, the first metric, the second metric, and the one or more thresholds. In some examples, the first metric, the second metric, or both correspond to a RSRP, an SINR, a doppler measurement, or a combination thereof.

In some examples, the uplink signaling component 1140 may be configured as or otherwise support a means for receiving, from the UE, an uplink reference signal based on the one or more signals. In some examples, the control message component 1135 may be configured as or otherwise support a means for transmitting a control message indicating the condition in response to the uplink reference signal.

In some examples, the one or more signals include TRSs. In some examples, the condition corresponds to a location of the UE relative to the set of TRPs, the location determined based on the TRSs.

In some examples, the one or more signals may include positioning signals, and the uplink signaling component 1140 may be configured as or otherwise support a means for receiving, from the UE via an uplink control channel, an uplink signal indicating a geographic location of the UE based on the positioning signals, the geographic location corresponding to the condition and the multi-TRP communications configuration. In some examples, the uplink signaling component 1140 may be configured as or otherwise support a means for receiving a PUCCH or a MAC-CE indicating the geographic location of the UE.

In some examples, the control message component 1135 may be configured as or otherwise support a means for transmitting, to the UE and one or more other UEs, a broadcast message indicating the multi-TRP communications configuration for the UE and the one or more other UEs based on the condition being common to the UE and the one or more other UEs.

In some examples, the control message component 1135 may be configured as or otherwise support a means for transmitting, to the UE, a control message indicating the one or more multi-TRP communications configurations including the multi-TRP communications configuration, each multi-TRP communications configuration of the one or more multi-TRP communications configurations corresponding to a respective condition.

In some examples, the respective condition corresponds to a respective zone of the UE relative to the set of TRPs. In some examples, a first zone associated with a first region that is associated with a first TRP of the set of TRPs corresponds to a single TRP communications configuration with the first TRP. In some examples, a second zone associated with a second region that is between the first TRP and a second TRP of the set of TRPs corresponds to an SFN communications scheme with the first TRP and the second TRP.

In some examples, the control message component 1135 may be configured as or otherwise support a means for transmitting DCI indicating a second multi-TRP communications configuration. In some examples, the communication component 1130 may be configured as or otherwise support a means for communicating with the UE according to the second multi-TRP communications configuration in accordance with the DCI.

In some examples, the multi-TRP communications configuration includes one or more of an SFN communications scheme, a multi-TRP communications scheme, or a non-SFN communications scheme.

Figure 12:
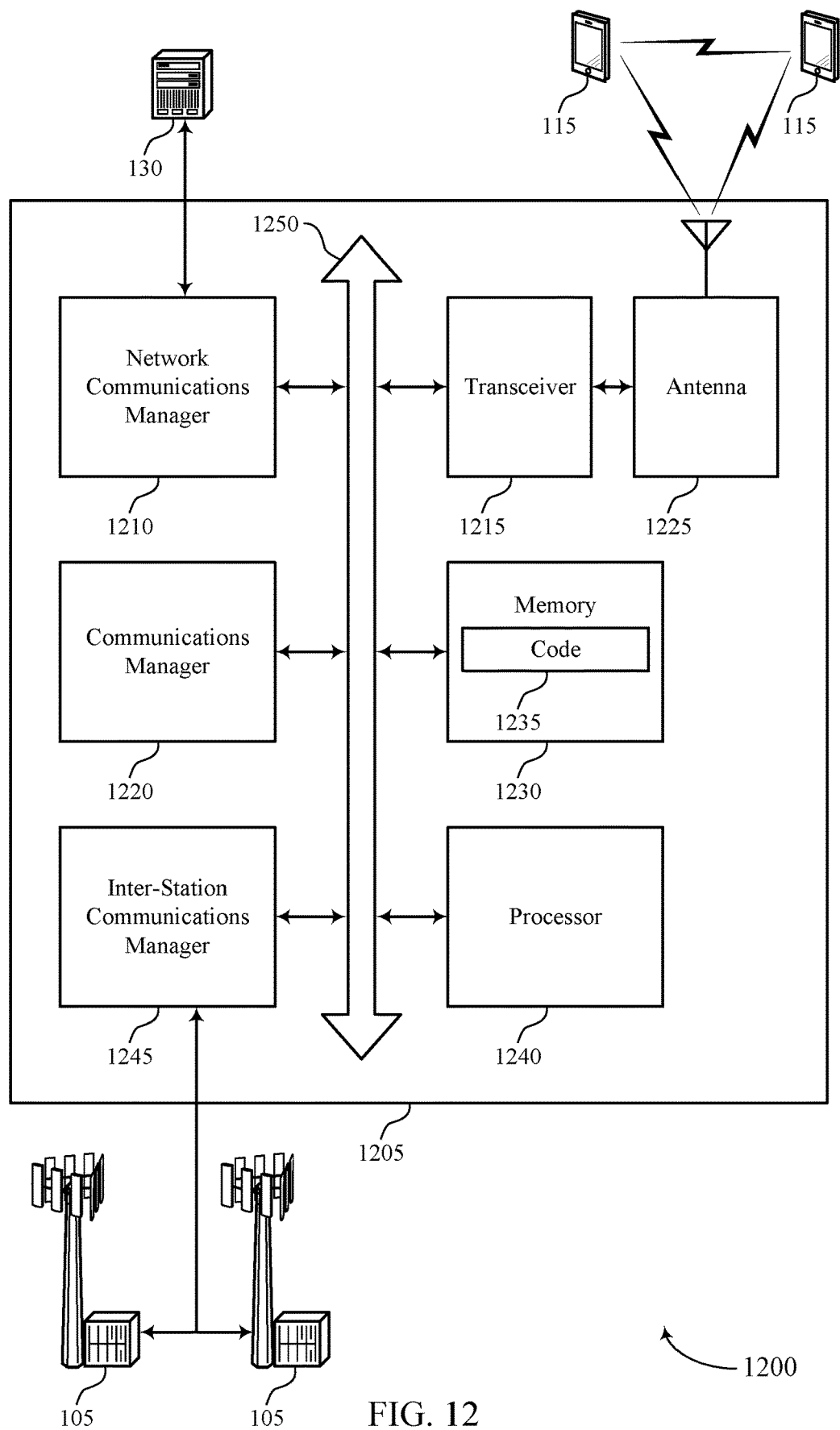
FIG. 12 shows a diagram of a system including a device that supports autonomous switching between SFN and non-SFN schemes in accordance with one or more aspects of the present disclosure.

FIG. 12 shows a diagram of a system 1200 including a device 1205 that supports autonomous switching between SFN and non-SFN schemes in accordance with one or more aspects of the present disclosure. The device 1205 may be an example of or include the components of a device 905, a device 1005, or a network node 105 as described herein. The device 1205 may communicate wirelessly with one or more network nodes 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting autonomous switching between SFN and non-SFN schemes). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other network nodes 105, and may include a controller or scheduler for controlling communications with UEs 115 in cooperation with other network nodes 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between network nodes 105.

The communications manager 1220 may support wireless communications at a network node including a set of TRPs associated with multi-TRP communications in accordance with examples as disclosed herein. For example, the communications manager 1220 may be configured as or otherwise support a means for transmitting, via at least one TRP of the set of TRPs, one or more signals to a UE, the one or more signals indicating a condition corresponding to the UE for the multi-TRP communications. The communications manager 1220 may be configured as or otherwise support a means for communicating with the UE via one or more TRPs of the set of TRPs associated with the multi-TRP communications based on the one or more signals, the communicating according to a multi-TRP communications configuration determined based on the condition.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of autonomous switching between SFN and non-SFN schemes as described herein, or the processor 1240 and the memory 1230 may be otherwise configured to perform or support such operations.

Figure 13:
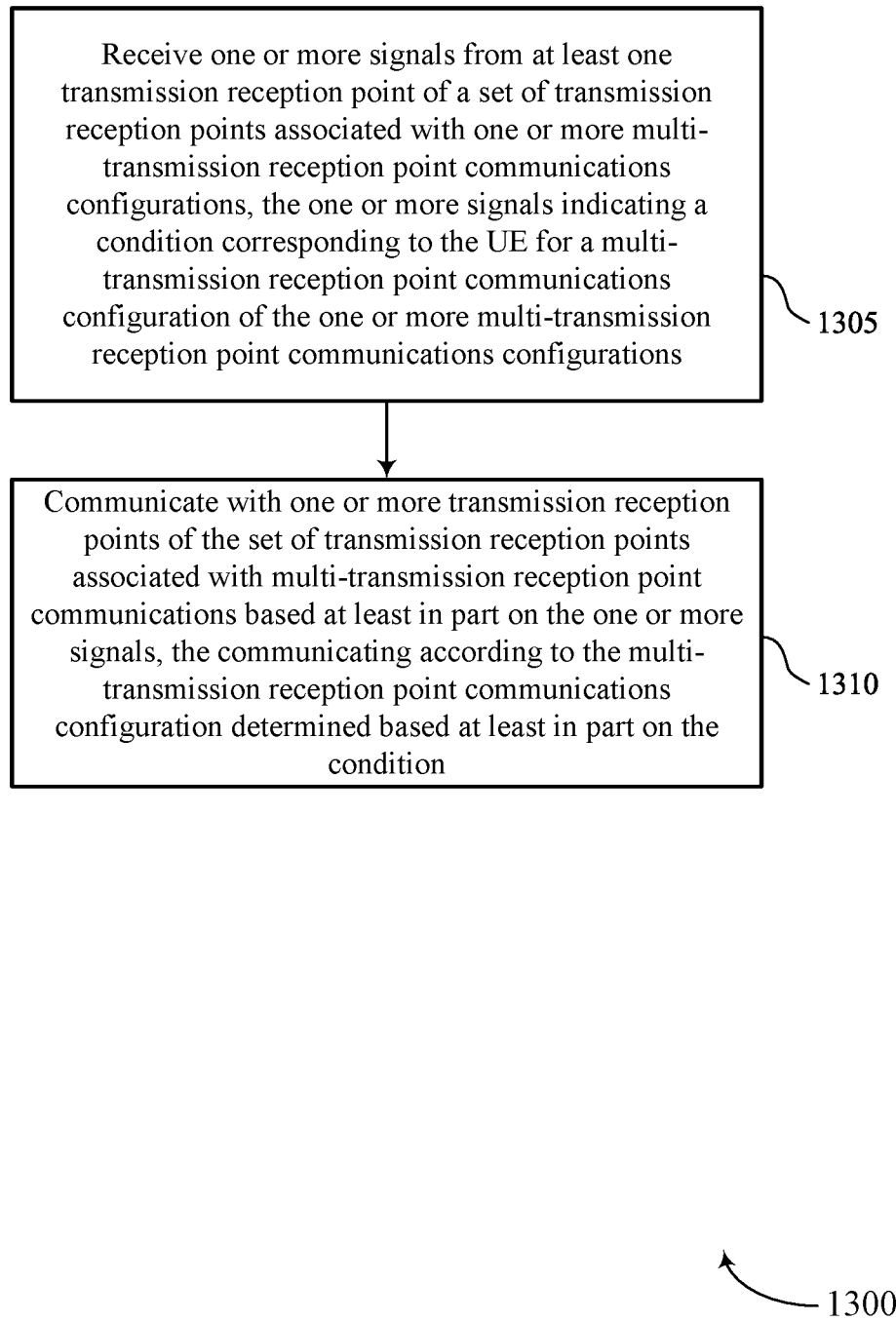
FIGS. 13 through 17 show flowcharts illustrating methods that support autonomous switching between SFN and non-SFN schemes in accordance with one or more aspects of the present disclosure.

FIG. 13 shows a flowchart illustrating a method 1300 that supports autonomous switching between SFN and non-SFN schemes in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving one or more signals from at least one TRP of a set of TRPs associated with one or more multi-TRP communications configurations, the one or more signals indicating a condition corresponding to the UE for a multi-TRP communications configuration of the one or more multi-TRP communications configurations. The operations of 1305 may be performed in accordance with examples as disclosed herein. In some examples, aspects of the operations of 1305 may be performed by a signal reception component 725 as described with reference to FIG. 7.

At 1310, the method may include communicating with one or more TRPs of the set of TRPs associated with multi-TRP communications based on the one or more signals, the communicating according to the multi-TRP communications configuration determined based on the condition. The operations of 1310 may be performed in accordance with examples as disclosed herein. In some examples, aspects of the operations of 1310 may be performed by a communication component 730 as described with reference to FIG. 7.

Figure 14:
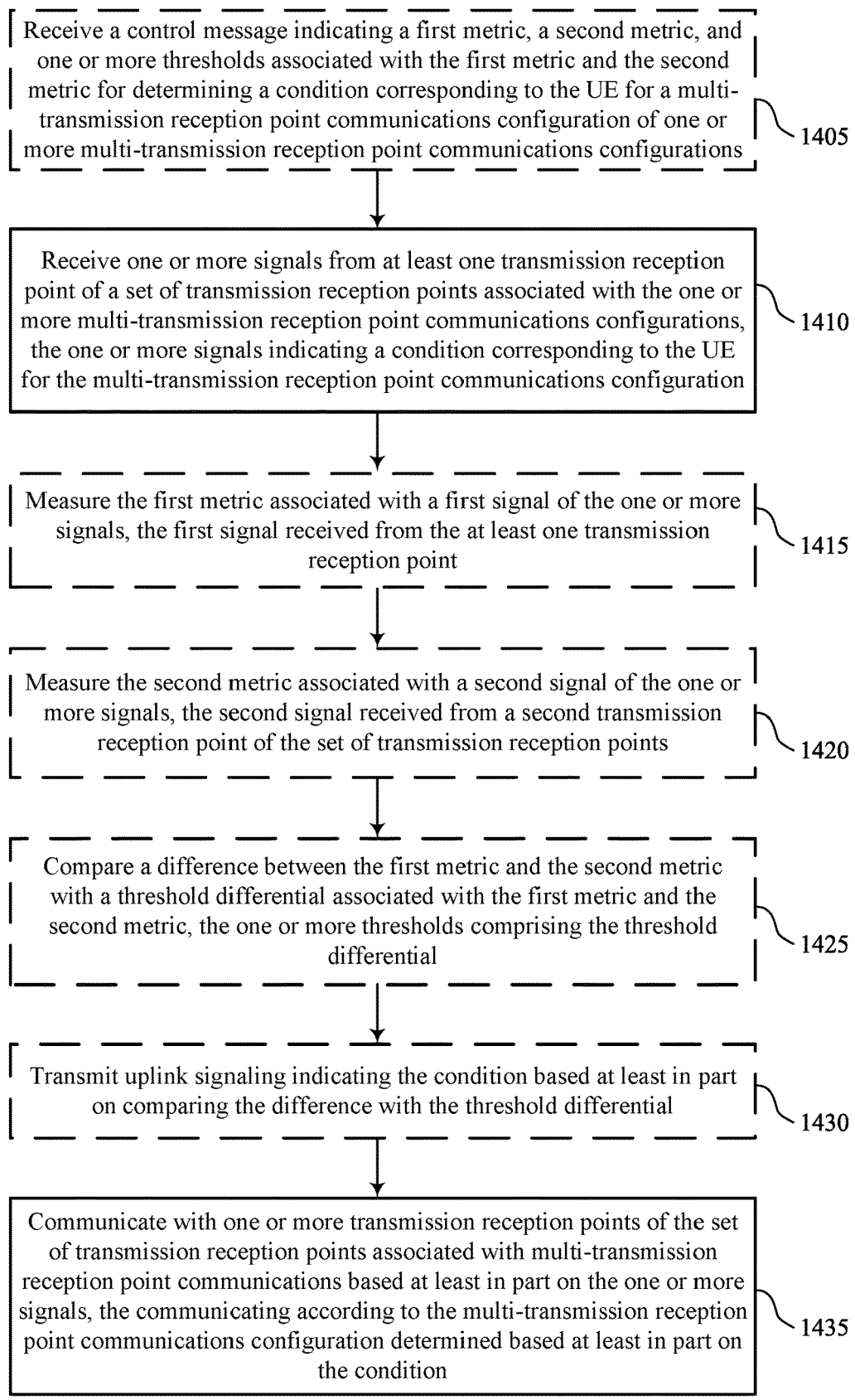

FIG. 14 shows a flowchart illustrating a method 1400 that supports autonomous switching between SFN and non-SFN schemes in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, in some examples, the method may include receiving a control message indicating a first metric, a second metric, and one or more thresholds associated with the first metric and the second metric for determining a condition corresponding to the UE for a multi-TRP communications configuration of one or more multi-TRP communications configurations. The operations of 1405 may be performed in accordance with examples as disclosed herein. In some examples, aspects of the operations of 1405 may be performed by a control message component 735 as described with reference to FIG. 7.

At 1410, the method may include receiving one or more signals from at least one TRP of a set of TRPs associated with the one or more multi-TRP communications configurations, the one or more signals indicating the condition corresponding to the UE for the multi-TRP communications configuration of the one or more multi-TRP communications configurations. The operations of 1410 may be performed in accordance with examples as disclosed herein. In some examples, aspects of the operations of 1410 may be performed by a signal reception component 725 as described with reference to FIG. 7.

At 1415, in some examples, the method may include measuring the first metric associated with a first signal of the one or more signals, the first signal received from the at least one TRP. The operations of 1415 may be performed in accordance with examples as disclosed herein. In some examples, aspects of the operations of 1415 may be performed by a signal measurement component 740 as described with reference to FIG. 7.

At 1420, in some examples, the method may include measuring the second metric associated with a second signal of the one or more signals, the second signal received from a second TRP of the set of TRPs. The operations of 1420 may be performed in accordance with examples as disclosed herein. In some examples, aspects of the operations of 1420 may be performed by a signal measurement component 740 as described with reference to FIG. 7.

At 1425, in some examples, the method may include comparing a difference between the first metric and the second metric with a threshold differential associated with the first metric and the second metric, the one or more thresholds including the threshold differential. The operations of 1425 may be performed in accordance with examples as disclosed herein. In some examples, aspects of the operations of 1425 may be performed by a signal measurement component 740 as described with reference to FIG. 7.

At 1430, in some examples, the method may include transmitting uplink signaling indicating the condition based on comparing the difference with the threshold differential. The operations of 1430 may be performed in accordance with examples as disclosed herein. In some examples, aspects of the operations of 1430 may be performed by an uplink signaling component 745 as described with reference to FIG. 7.

At 1435, the method may include communicating with one or more TRPs of the set of TRPs associated with multi-TRP communications based on the one or more signals, the communicating according to the multi-TRP communications configuration determined based on the condition. The operations of 1435 may be performed in accordance with examples as disclosed herein. In some examples, aspects of the operations of 1435 may be performed by a communication component 730 as described with reference to FIG. 7.

Figure 15:
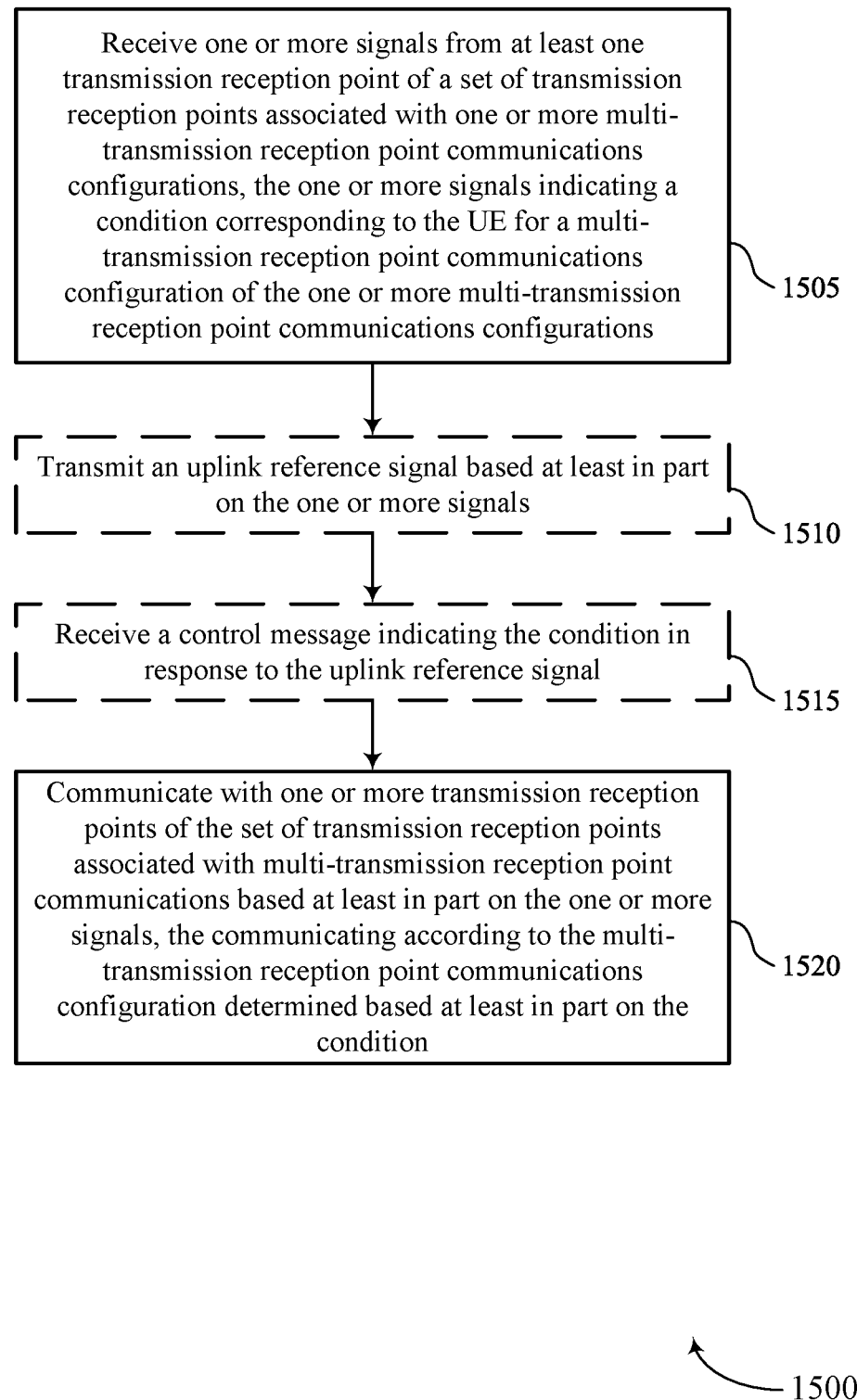

FIG. 15 shows a flowchart illustrating a method 1500 that supports autonomous switching between SFN and non-SFN schemes in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving one or more signals from at least one TRP of a set of TRPs associated with one or more multi-TRP communications configurations, the one or more signals indicating a condition corresponding to the UE for a multi-TRP communications configuration of the one or more multi-TRP communications configurations. The operations of 1505 may be performed in accordance with examples as disclosed herein. In some examples, aspects of the operations of 1505 may be performed by a signal reception component 725 as described with reference to FIG. 7.

At 1510, in some examples, the method may include transmitting an uplink reference signal based on the one or more signals. The operations of 1510 may be performed in accordance with examples as disclosed herein. In some examples, aspects of the operations of 1510 may be performed by an uplink signaling component 745 as described with reference to FIG. 7.

At 1515, in some examples, the method may include receiving a control message indicating the condition in response to the uplink reference signal. The operations of 1515 may be performed in accordance with examples as disclosed herein. In some examples, aspects of the operations of 1515 may be performed by a control message component 735 as described with reference to FIG. 7.

At 1520, the method may include communicating with one or more TRPs of the set of TRPs associated with multi-TRP communications based on the one or more signals, the communicating according to the multi-TRP communications configuration determined based on the condition. The operations of 1520 may be performed in accordance with examples as disclosed herein. In some examples, aspects of the operations of 1520 may be performed by a communication component 730 as described with reference to FIG. 7.

Figure 16:
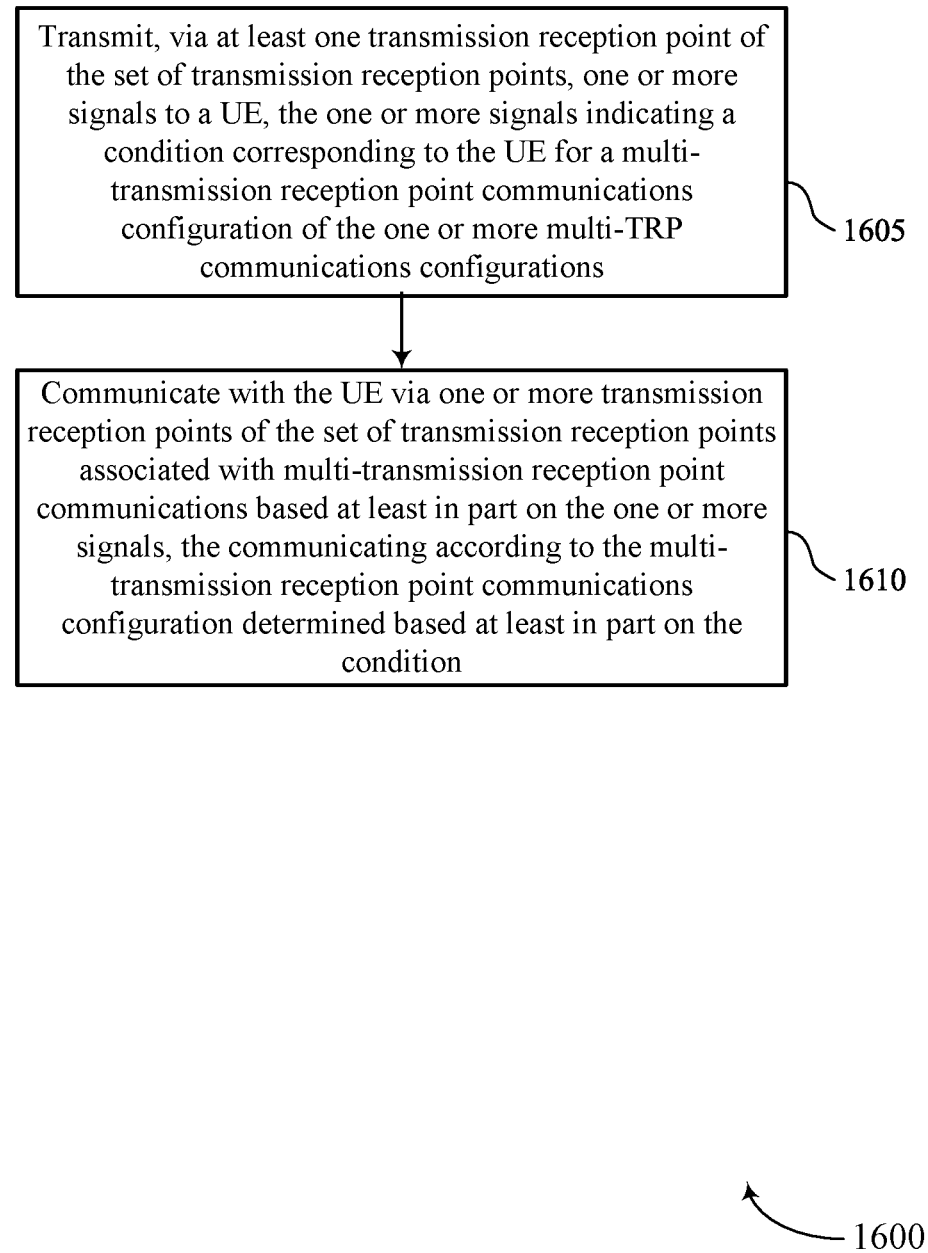

FIG. 16 shows a flowchart illustrating a method 1600 that supports autonomous switching between SFN and non-SFN schemes in accordance with one or more aspects of the present disclosure. The operations of the method 1600 may be implemented by a network node or its components as described herein. For example, the operations of the method 1600 may be performed by a network node 105 as described with reference to FIGS. 1 through 3 and 9 through 12. In some examples, a network node may execute a set of instructions to control the functional elements of the network node to perform the described functions. Additionally, or alternatively, the network node may perform aspects of the described functions using special-purpose hardware. The network node 105 may include a set of TRPs associated with one or more multi-TRP communications configurations.

At 1605, the method may include transmitting, via at least one TRP of the set of TRPs, one or more signals to a UE, the one or more signals indicating a condition corresponding to the UE for a multi-TRP communications configuration of the one or more multi-TRP communications configurations. The operations of 1605 may be performed in accordance with examples as disclosed herein. In some examples, aspects of the operations of 1605 may be performed by a signal transmission component 1125 as described with reference to FIG. 11.

At 1610, the method may include communicating with the UE via one or more TRPs of the set of TRPs associated with multi-TRP communications based on the one or more signals, the communicating according to the multi-TRP communications configuration determined based on the condition. The operations of 1610 may be performed in accordance with examples as disclosed herein. In some examples, aspects of the operations of 1610 may be performed by a communication component 1130 as described with reference to FIG. 11.

Figure 17:
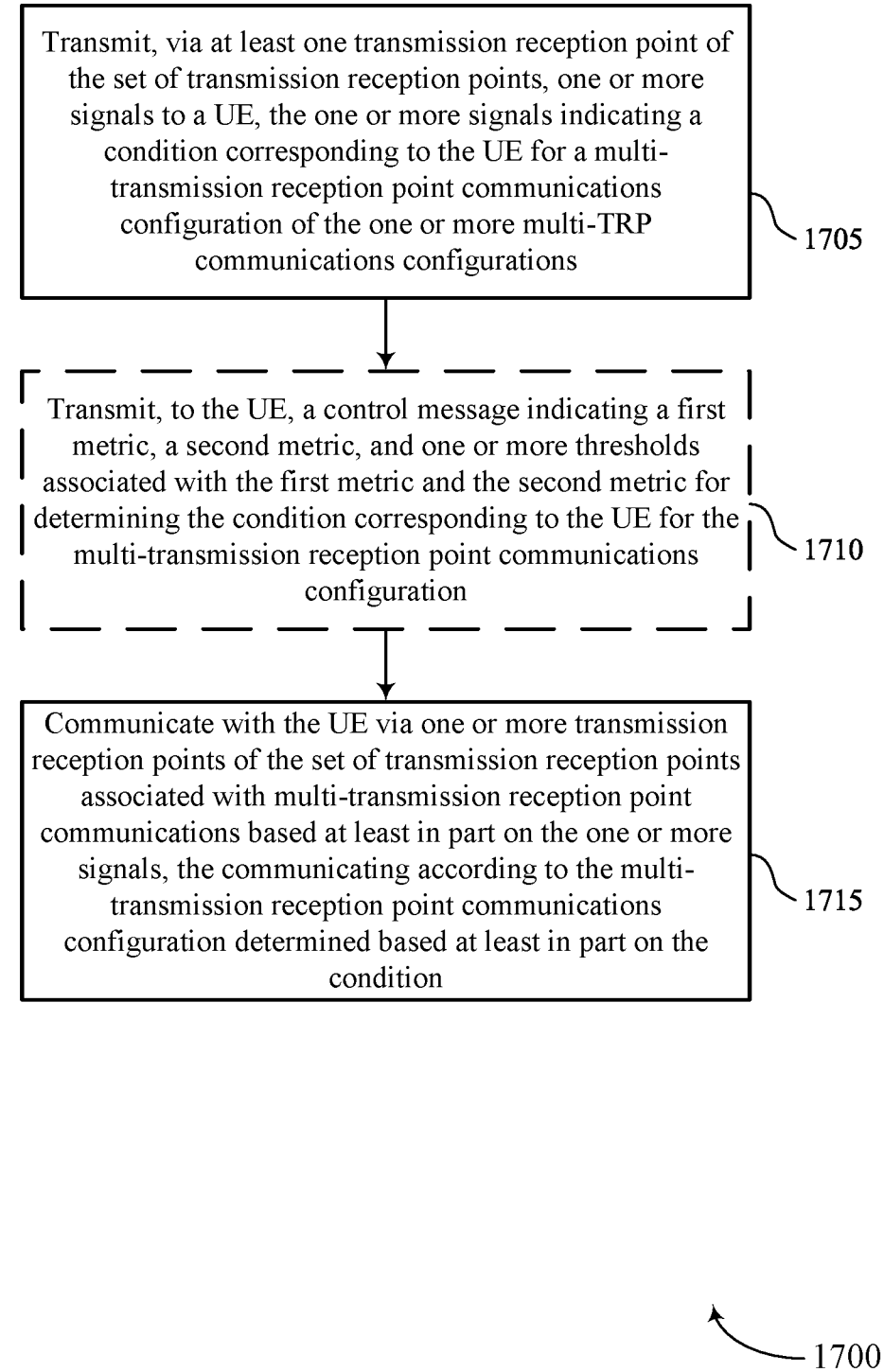

FIG. 17 shows a flowchart illustrating a method 1700 that supports autonomous switching between SFN and non-SFN schemes in accordance with one or more aspects of the present disclosure. The operations of the method 1700 may be implemented by a network node or its components as described herein. For example, the operations of the method 1700 may be performed by a network node 105 as described with reference to FIGS. 1 through 3 and 9 through 12. In some examples, a network node may execute a set of instructions to control the functional elements of the network node to perform the described functions. Additionally, or alternatively, the network node may perform aspects of the described functions using special-purpose hardware. The network node 105 may include a set of TRPs associated with one or more multi-TRP communications configurations.

At 1705, the method may include transmitting, via at least one TRP of the set of TRPs, one or more signals to a UE, the one or more signals indicating a condition corresponding to the UE for a multi-TRP communications configuration of the one or more multi-TRP communications configurations. The operations of 1705 may be performed in accordance with examples as disclosed herein. In some examples, aspects of the operations of 1705 may be performed by a signal transmission component 1125 as described with reference to FIG. 11.

At 1710, in some examples, the method may include transmitting, to the UE, a control message indicating a first metric, a second metric, and one or more thresholds associated with the first metric and the second metric for determining the condition corresponding to the UE for the multi-TRP communications configuration. The operations of 1710 may be performed in accordance with examples as disclosed herein. In some examples, aspects of the operations of 1710 may be performed by a control message component 1135 as described with reference to FIG. 11.

At 1715, the method may include communicating with the UE via one or more TRPs of the set of TRPs associated with multi-TRP communications based on the one or more signals, the communicating according to the multi-TRP communications configuration determined based on the condition. The operations of 1715 may be performed in accordance with examples as disclosed herein. In some examples, aspects of the operations of 1715 may be performed by a communication component 1130 as described with reference to FIG. 11.

The following provides an overview of aspects of the present disclosure:

Aspect 1: A method for wireless communications at a UE, comprising: receiving one or more signals from at least one TRP of a set of TRPs associated with one or more multi-TRP communications configurations, the one or more signals indicating a condition corresponding to the UE for a multi-TRP communication configuration of the one or more multi-TRP communications configurations; and communicating with one or more TRPs of the set of TRPs associated with multi-TRP communications based at least in part on the one or more signals, the communicating according to the multi-TRP communications configuration determined based at least in part on the condition.

Aspect 2: The method of aspect 1, further comprising: receiving a control message indicating a first metric, a second metric, and one or more thresholds associated with the first metric and the second metric for determining the condition corresponding to the UE for the multi-TRP communications configuration; measuring the first metric associated with a first signal of the one or more signals, the first signal received from the at least one TRP; and measuring the second metric associated with a second signal of the one or more signals, the second signal received from a second TRP of the set of TRPs.

Aspect 3: The method of aspect 2, further comprising: comparing a difference between the first metric and the second metric with a threshold differential associated with the first metric and the second metric, the one or more thresholds comprising the threshold differential; and transmitting uplink signaling indicating the condition based at least in part on comparing the difference with the threshold differential.

Aspect 4: The method of aspect 2, further comprising: comparing the first metric with a first threshold, wherein the one or more thresholds comprise the first threshold; comparing the second metric with a second threshold, wherein the one or more thresholds comprise the second threshold; and transmitting uplink signaling indicating the condition based at least in part on comparing the first metric with the first threshold and comparing the second metric with the second threshold.

Aspect 5: The method of any of aspects 2 through 4, wherein the first metric, the second metric, or both correspond to an RSRP, an SINR, a doppler measurement, or a combination thereof.

Aspect 6: The method of any of aspects 1 through 2, further comprising: transmitting an uplink reference signal based at least in part on the one or more signals; and receiving a control message indicating the condition in response to the uplink reference signal.

Aspect 7: The method of any of aspects 1 through 6, wherein the one or more signals comprise TRSs; and the condition corresponds to a location of the UE relative to the set of TRPs, the location determined based at least in part on the TRSs.

Aspect 8: The method of any of aspects 1 through 2, the one or more signals comprising positioning signals and the method further comprising: determining a geographic location of the UE based at least in part on the positioning signals; and transmitting, via an uplink control channel, an uplink signal indicating the geographic location of the UE, the geographic location corresponding to the condition and the multi-TRP communications configuration.

Aspect 9: The method of aspect 8, the transmitting comprising: transmitting a PUCCH or a MAC-CE indicating the geographic location of the UE.

Aspect 10: The method of any of aspects 8 through 9, further comprising: determining the geographic location of the UE based at least in part on a speed of the UE, or a trajectory of the UE, or both, the UE moving relative to the set of TRPs.

Aspect 11: The method of any of aspects 1 through 10, further comprising: receiving a broadcast message indicating the multi-TRP communications configuration for the UE and one or more other UEs, the broadcast message based at least in part on the condition being common to the UE and the one or more other UEs.

Aspect 12: The method of any of aspects 1 through 11, further comprising: receiving a control message indicating the one or more multi-TRP communications configurations comprising the multi-TRP communications configuration, each multi-TRP communications configuration of the one or more multi-TRP communications configurations corresponding to a respective condition.

Aspect 13: The method of aspect 12, wherein the respective condition corresponds to a respective zone of the UE relative to the set of TRPs; a first zone associated with a first region that is associated with a first TRP of the set of TRPs corresponds to a single TRP communications configuration with the first TRP; and a second zone associated with a second region that is between the first TRP and a second TRP of the set of TRPs corresponds to an SFN communications scheme with the first TRP and the second TRP.

Aspect 14: The method of any of aspects 1 through 13, further comprising: receiving DCI indicating a second multi-TRP communications configuration; and communicating with the one or more TRPs according to the second multi-TRP communications configuration in accordance with the DCI.

Aspect 15: The method of any of aspects 1 through 14, wherein the multi-TRP communications configuration comprises one or more of an SFN communications scheme, a multi-TRP communications scheme, or a non-SFN communications scheme.

Aspect 16: A method for wireless communications at a network node comprising a set of TRPs associated with one or more multi-TRP communications configurations, the method comprising: transmitting, via at least one TRP of the set of TRPs, one or more signals to a UE, the one or more signals indicating a condition corresponding to the UE for a multi-TRP communications configuration of the one or more multi-TRP communications configurations; communicating with the UE via one or more TRPs of the set of TRPs associated with multi-TRP communications based at least in part on the one or more signals, the communicating according to the multi-TRP communications configuration determined based at least in part on the condition.

Aspect 17: The method of aspect 16, further comprising: transmitting, to the UE, a control message indicating a first metric, a second metric, and one or more thresholds associated with the first metric and the second metric for determining the condition corresponding to the UE for the multi-TRP communications configuration.

Aspect 18: The method of aspect 17, further comprising: receiving uplink signaling from the UE indicating the condition based at least in part on the one or more signals, the first metric, the second metric, and the one or more thresholds.

Aspect 19: The method of any of aspects 17 through 18, wherein the first metric, the second metric, or both correspond to a RSRP, a SINR, a doppler measurement, or a combination thereof.

Aspect 20: The method of any of aspects 16 through 17, further comprising: receiving, from the UE, an uplink reference signal based at least in part on the one or more signals; and transmitting a control message indicating the condition in response to the uplink reference signal.

Aspect 21: The method of any of aspects 16 through 20, wherein the one or more signals comprise TRSs; and the condition corresponds to a location of the UE relative to the set of TRPs, the location determined based at least in part on the TRSs.

Aspect 22: The method of any of aspects 16 through 17, the one or more signals comprising positioning signals and the method further comprising: receiving, from the UE via an uplink control channel, an uplink signal indicating a geographic location of the UE based at least in part on the positioning signals, the geographic location corresponding to the condition and the multi-TRP communications configuration.

Aspect 23: The method of aspect 22, the receiving comprising: receiving a PUCCH or a MAC-CE indicating the geographic location of the UE.

Aspect 24: The method of any of aspects 16 through 23, further comprising: transmitting, to the UE and one or more other UEs, a broadcast message indicating the multi-TRP communications configuration for the UE and the one or more other UEs based at least in part on the condition being common to the UE and the one or more other UEs.

Aspect 25: The method of any of aspects 16 through 24, further comprising:
transmitting, to the UE, a control message indicating the one or more multi-TRP communications configurations comprising the multi-TRP communications configuration, each multi-TRP communications configuration of the one or more multi-TRP communications configurations corresponding to a respective condition.

Aspect 26: The method of aspect 25, wherein the respective condition corresponds to a respective zone of the UE relative to the set of TRPs; a first zone associated with a first region that is associated with a first TRP of the set of TRPs corresponds to a single TRP communications configuration with the first TRP; and a second zone associated with a second region that is between the first TRP and a second TRP of the set of TRPs corresponds to an SFN communications scheme with the first TRP and the second TRP.

Aspect 27: The method of any of aspects 16 through 26, further comprising: transmitting DCI indicating a second multi-TRP communications configuration; and communicating with the UE according to the second multi-TRP communications configuration in accordance with the DCI.

Aspect 28: The method of any of aspects 16 through 27, wherein the multi-TRP communications configuration comprises one or more of an SFN communications scheme, a multi-TRP communications scheme, or a non-SFN communications scheme.

Aspect 29: An apparatus for wireless communications at a UE, comprising a processor; and memory coupled with the processor, the processor and memory configured to perform a method of any of aspects 1 through 15.

Aspect 30: An apparatus for wireless communications at a UE, comprising at least one means for performing a method of any of aspects 1 through 15.

Aspect 31: A non-transitory computer-readable medium storing code for wireless communications at a UE, the code comprising instructions executable by a processor to perform a method of any of aspects 1 through 15.

Aspect 32: An apparatus for wireless communications at a network node comprising a set of TRPs associated with multi-TRP communications, the apparatus comprising a processor; and memory coupled with the processor, the processor and memory configured to perform a method of any of aspects 16 through 28.

Aspect 33: An apparatus for wireless communications at a network node comprising a set of TRPs associated with multi-TRP communications, the apparatus comprising at least one means for performing a method of any of aspects 16 through 28.

Aspect 34: A non-transitory computer-readable medium storing code for wireless communications at a network node comprising a set of TRPs associated with multi-TRP communications, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor; and
memory coupled with the processor, the processor and memory configured to:
receive one or more signals from at least one transmission reception point of a set of transmission reception points associated with one or more multi-transmission reception point communications configurations, the one or more signals indicating a condition corresponding to the UE for a multi-transmission reception point communications configuration of the one or more multi-transmission reception point communications configurations, wherein the condition corresponds to a location of the UE relative to the set of transmission reception points; and
communicate with one or more transmission reception points of the set of transmission reception points associated with multi-transmission reception point communications based at least in part on the one or more signals, the communicating according to the multi-transmission reception point communications configuration determined based at least in part on the condition;
wherein the processor and memory are further configured to:
compare a difference between a first metric and a second metric with a threshold differential associated with the first metric and the second metric, one or more thresholds comprising the threshold differential, and
transmit uplink signaling indicating the condition based at least in part on comparing the difference with the threshold differential.

2. The apparatus of claim 1, wherein the processor and memory are further configured to:
receive a control message indicating the first metric, the second metric, and the one or more thresholds associated with the first metric and the second metric for determining the condition corresponding to the UE for the multi-transmission reception point communications configuration;
measure the first metric associated with a first signal of the one or more signals, the first signal received from the at least one transmission reception point; and
measure the second metric associated with a second signal of the one or more signals, the second signal received from a second transmission reception point of the set of transmission reception points.

3. The apparatus of claim 2, wherein the processor and memory are further configured to:
compare the first metric with a first threshold, wherein the one or more thresholds comprise the first threshold;
compare the second metric with a second threshold, wherein the one or more thresholds comprise the second threshold; and
transmit uplink signaling indicating the condition based at least in part on comparing the first metric with the first threshold and comparing the second metric with the second threshold.

4. The apparatus of claim 2, wherein the first metric, the second metric, or both correspond to a reference signal received power, a signal-to-interference-plus-noise ratio, a doppler measurement, or a combination thereof.

5. The apparatus of claim 1, wherein the processor and memory are further configured to:
transmit an uplink reference signal based at least in part on the one or more signals; and
receive a control message indicating the condition in response to the uplink reference signal.

6. The apparatus of claim 1, wherein:
the one or more signals comprise tracking reference signals; and
the location of the UE relative to the set of transmission reception points is determined based at least in part on the tracking reference signals.

7. The apparatus of claim 1, the one or more signals comprising positioning signals, wherein the processor and memory are further configured to:
determine a geographic location of the UE based at least in part on the positioning signals; and
transmit, via an uplink control channel, an uplink signal indicating the geographic location of the UE, the geographic location corresponding to the condition and the multi-transmission reception point communications configuration.

8. The apparatus of claim 7, wherein to transmit the uplink signal, the processor and memory are further configured to:
transmit a physical uplink control channel or a medium access control-control element indicating the geographic location of the UE.

9. The apparatus of claim 7, wherein the processor and memory are further configured to:
determine the geographic location of the UE based at least in part on a speed of the UE, or a trajectory of the UE, or both, the UE moving relative to the set of transmission reception points.

10. The apparatus of claim 1, wherein the processor and memory are further configured to:
receive a broadcast message indicating the multi-transmission reception point communications configuration for the UE and one or more other UEs, the broadcast message based at least in part on the condition being common to the UE and the one or more other UEs.

11. An apparatus for wireless communications at a user equipment (UE), comprising:
a processor; and
memory coupled with the processor, the processor and memory configured to:
receive one or more signals from at least one transmission reception point of a set of transmission reception points associated with one or more multi-transmission reception point communications configurations, the one or more signals indicating a condition corresponding to the UE for a multi-transmission reception point communications configuration of the one or more multi-transmission reception point communications configurations, wherein the condition corresponds to a location of the UE relative to the set of transmission reception points;

communicate with one or more transmission reception points of the set of transmission reception points associated with multi-transmission reception point communications based at least in part on the one or more signals, the communicating according to the multi-transmission reception point communications configuration determined based at least in part on the condition; and receive a control message indicating the one or more multi-transmission reception point communications configurations comprising the multi-transmission reception point communications configuration, each multi-transmission reception point communications configuration of the one or more multi-transmission reception point communications configurations corresponding to a respective condition;

wherein:
  the respective condition corresponds to a respective zone of the UE relative to the set of transmission reception points;
  a first zone associated with a first region that is associated with a first transmission reception point of the set of transmission reception points corresponds to a single transmission reception point communications configuration with the first transmission reception point; and
  a second zone associated with a second region that is between the first transmission reception point and a second transmission reception point of the set of transmission reception points corresponds to a single frequency network communications scheme with the first transmission reception point and the second transmission reception point.

12. The apparatus of claim 1, wherein the processor and memory are further configured to:
  receive downlink control information indicating a second multi-transmission reception point communications configuration; and
  communicate with the one or more transmission reception points according to the second multi-transmission reception point communications configuration in accordance with the downlink control information.

13. An apparatus for wireless communications at a network node, comprising:
  a set of transmission reception points associated with one or more multi-transmission reception point communications configurations;
  a processor; and
  memory coupled with the processor, the processor and memory configured to:
    transmit, via at least one transmission reception point of the set of transmission reception points, one or more signals to a user equipment (UE), the one or more signals indicating a condition corresponding to the UE for a multi-transmission reception point communications configuration of the one or more multi-transmission reception point communications configurations, wherein the condition corresponds to a location of the UE relative to the set of transmission reception points;
    communicate with the UE via one or more transmission reception points of the set of transmission reception points associated with multi-transmission reception point communications based at least in part on the one or more signals, the communicating according to the multi-transmission reception point communications configuration determined based at least in part on the condition; and
    transmit, to the UE, a control message indicating the one or more multi-transmission reception point communications configurations comprising the multi-transmission reception point communications configuration, each multi-transmission reception point communications configuration of the one or more multi-transmission reception point communications configurations corresponding to a respective condition;
  wherein:
    the respective condition corresponds to a respective zone of the UE relative to the set of transmission reception points;
    a first zone associated with a first region that is associated with a first transmission reception point of the set of transmission reception points corresponds to a single transmission reception point communications configuration with the first transmission reception point; and
    a second zone associated with a second region that is between the first transmission reception point and a second transmission reception point of the set of transmission reception points corresponds to a single frequency network communications scheme with the first transmission reception point and the second transmission reception point.

14. A method for wireless communications at a user equipment (UE), comprising:
  receiving one or more signals from at least one transmission reception point of a set of transmission reception points associated with one or more multi-transmission reception point communications configurations, the one or more signals indicating a condition corresponding to the UE for a multi-transmission reception point communications configuration of the one or more multi-transmission reception point communications configurations, wherein the condition corresponds to a location of the UE relative to the set of transmission reception points;
  communicating with one or more transmission reception points of the set of transmission reception points associated with multi-transmission reception point communications based at least in part on the one or more signals, the communicating according to the multi-transmission reception point communications configuration determined based at least in part on the condition; and
  further comprising:
    comparing a difference between a first metric and a second metric with a threshold differential associated with the first metric and the second metric, one or more thresholds comprising the threshold differential, and
    transmitting uplink signaling indicating the condition based at least in part on comparing the difference with the threshold differential.

15. The method of claim 14, further comprising:
  receiving a control message indicating the first metric, the second metric, and the one or more thresholds associated with the first metric and the second metric for determining the condition corresponding to the UE for the multi-transmission reception point communications;

measuring the first metric associated with a first signal of the one or more signals, the first signal received from the at least one transmission reception point; and measuring the second metric associated with a second signal of the one or more signals, the second signal received from a second transmission reception point of the set of transmission reception points.

16. The apparatus of claim 1, wherein the multi transmission reception point communications configuration comprises one or more of a single frequency network communications scheme, a multi-transmission reception point communications scheme, or a non-single frequency network communications scheme.

\* \* \* \* \*